United States Patent
Ochi et al.

(10) Patent No.: US 8,551,635 B2
(45) Date of Patent: Oct. 8, 2013

(54) POWER SUPPLY DEVICE AND VEHICLE INCLUDING POWER SUPPLY DEVICE

(75) Inventors: Shingo Ochi, Takasago (JP); Masao Kume, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 13/564,199

(22) Filed: Aug. 1, 2012

(65) Prior Publication Data

US 2013/0034764 A1 Feb. 7, 2013

(30) Foreign Application Priority Data

Aug. 2, 2011 (JP) .................................. 2011-169675

(51) Int. Cl.
*H01M 2/10* (2006.01)

(52) U.S. Cl.
USPC ............. 429/99; 429/100; 429/171; 429/174; 429/175

(58) Field of Classification Search
USPC ................... 429/99, 163, 171, 174, 175, 177, 429/185, 100, 96, 149, 153, 159; 180/65.32
See application file for complete search history.

(56) References Cited

U.S. PATENT DOCUMENTS

| 6,106,973 | A  | * | 8/2000 | Sonozaki et al. | 429/162 |
| 2002/0010998 | A1 | * | 1/2002 | Komatsu | 429/181 |
| 2011/0236750 | A1 | * | 9/2011 | Kohno et al. | 429/181 |

FOREIGN PATENT DOCUMENTS

JP 2009-170258 7/2009

* cited by examiner

*Primary Examiner* — Raymond Alejandro
*Assistant Examiner* — Ling R Zeng
(74) *Attorney, Agent, or Firm* — Wenderoth, Lind & Ponack, L.L.P.

(57) ABSTRACT

A power supply includes rectangular battery cells 1. Each cell 1 includes a rectangular container 11 covered with an electrically insulating film 2. The film 2 has a bottom cover 22, main covers 21, and side covers 23. The bottom cover 22 is arranged between the main covers 21. The side covers 23 protrude from the both sides of the main and bottom covers 21 and 22. Each side cover 23 has first and second side covers 23A and 23B. The first and second side covers 23A and 23B protrude from the side edges of the main and bottom covers 21 and 22. The first and second side covers 23A and 23B are continuously arranged in connection areas 24. When folded on side surfaces 11D of the container 11, the first and second side covers 23A and 23B are superposed on one another. The superposed parts 25 are welded.

13 Claims, 35 Drawing Sheets

POWER SUPPLY DEVICE AND VEHICLE INCLUDING POWER SUPPLY DEVICE

BACKGROUND OF THE INVENTION

1. Field of the Invention

The present invention relates to a power supply device that includes a number of battery cells, which are arranged side by side, and in particular to a power supply device that can supply electric power to an electric motor for vehicle traveling, a power supply device that can be charged with electric power generated by natural power sources such as solar batteries or with midnight electric power, a power supply device suitable as blackout backup power supplies that are suitably prepared for a blackout, and a vehicle that includes the power supply device.

2. Description of the Related Art

A power supply device required to provide a large amount of output power includes a number of batteries that are connected in series or in parallel to each other for increasing its output power. For example, a plurality of rectangular battery cells are arranged side by side in an exterior case (see Japanese Patent Laid-Open Publication No. JP 2009-170,258 A) such as in a power supply device for vehicles such as an electric vehicle that is driven by an electric motor and a hybrid car that is drive both by an electric motor and an internal-combustion engine, a power supply device that can be charged by natural power sources, a power supply device that can be suitably prepared for a blackout, or the like. In this power supply device, as shown in FIG. 34, a number of rectangular battery cells 101 are arranged side by side, and compose a battery block 110. The rectangular battery cell 101 includes positive/negative electrode terminals 113 that are arranged on the upper surface of the upper surface of a rectangular exterior container 111, as shown in FIG. 35. In the case where the electrode terminals 113 of the rectangular battery cells 101 are serially connected to each other in the battery block 110, the output voltage of the battery block 110 can be high.

In the case where the exterior container 111 is formed of a metal such as aluminum, the rectangular battery cell 101 can be thin and have high stiffness. Lithium-ion rechargeable batteries or nickel metal hydride batteries can be used as the rectangular battery cells. In the case of lithium ion batteries, the exterior container is not connected to the electrodes. Accordingly, a potential on the exterior container will be an intermediate potential between the positive/negative electrode terminals. In the case of nickel metal hydride batteries, the exterior container is connected to one of the positive/negative electrodes. Accordingly, a potential on the exterior container is the same as the electrode that is connected to the exterior container. For this reason, when these rectangular battery cells are arranged side by side so that the battery cells adjacent to each other are serially connected to each other, potential difference will be provided between the exterior containers of the adjacent batteries. When these rectangular battery cells are arranged side by side and serially connected to each other, in order to prevent a short circuit current from flowing through the exterior containers of the batteries, it is necessary to electrically insulate the adjacent batteries from each other. In addition, in order to prevent leakage of current, it is necessary to electrically insulate the rectangular battery cells, which are arranged side by side, from the ground. In order to achieve this, in the case where the battery block includes the rectangular battery cells that are arranged side by side, the exterior containers are electrically insulated from each other. In order to electrically insulate the exterior containers from each other, an electrically insulating separator is sandwiched between the rectangular battery cells. In addition, the surfaces of the exterior container are covered by an electrically insulating sheet. In the case where, the surfaces of the exterior container of the rectangular battery cell are covered by the electrically insulating sheet, it is possible to prevent leakage of current that is caused with water condensed on the surface of the exterior container.

Power supply devices are used in various external environments. For this reason, water may be condensed on the surfaces of power supply devices in some cases. If water is condensed on the surface of the exterior container, the condensed water may cause leakage of current and short circuit current. The reason is that current may flow through the condensed water from one exterior container to another exterior container adjacent to this one exterior container, or current may flow through the condensed water from the exterior container to the ground line, and cause leakage of current. This problem can be prevented by covering the exterior container with the electrically insulating sheet. In particular, if water is condensed on the exterior container, the water will flow downward along the surface of the exterior container. For this reason, it is important to more reliably make the bottom of the exterior container watertight by covering the bottom of the exterior container with the electrically insulating sheet.

In addition, the battery block is placed on and fastened to a bottom plate of the exterior case, which is formed by the working of metal. Alternatively, the battery block is placed on and fastened to a metal cooling plate. Accordingly, if the bottom surface of the exterior container comes in contact with the exterior case or the cooling plate, the problem will arise that short current flows from the rectangular battery cell, or leakage of current occurs.

In order to electrically insulate the exterior container of the rectangular battery cell, in a conventional power supply device shown in FIGS. 36A-36C, the exterior container is inserted into a bag-shaped heat contraction sheet 102 that has a closed bottom so that a bottom surface 111B and the periphery of the exterior container 111 are covered. Specifically, a tube-shaped heat contraction sheet having upper and lower opened ends is divided by cutting into the heat contraction sheets 102, which have a certain length. As shown in FIG. 37, the rectangular battery cell 101 is inserted into the heat contraction sheet 102. Subsequently, the opposed end parts of the heat contraction sheet 102 are welded on the rectangular battery cell 101 bottom surface 111B side by heat as shown in FIGS. 38A and 38B. After that, the heat contraction sheet 211A is shrink-fitted over the battery cell 36. Thus, the heat contraction sheet 102 is brought in tight contact with surfaces of the exterior container 111 as shown in FIGS. 36A-36C.

In this case, as shown in the cross-sectional view of FIG. 36C, the welded part 102x protrudes from the bottom surface 111B of the rectangular battery cell 101. In the case where the welded part 102x protrudes from the bottom surface 111B, the thermal resistivity will increase between the rectangular battery cell 101 and the cooling plate (not shown). Accordingly, the thermally connected state will be poor. In addition, the alignment of the bottom surfaces 111B of the rectangular battery cells 101 will be uneven. As a result, there is a problem that will be difficult to hold the rectangular battery cells 101 on the same plane. On the other hand, since the welded part protrudes from the bottom surface of the rectangular battery cell, the welded part will be likely damaged by the weight of the battery block, or vibration. As a result, in the case where the battery block is placed on and is fastened to the bottom plate of the exterior case or the cooling plate, the damage on the heat contraction sheet may cause leakage of current or short circuit.

Although not illustrated, it is conceivable that the welded part, which protrudes from the bottom surface, is arranged in a gap between the separators adjacent to each other. In the thus-constructed battery block, the exterior container may not be directly thermally connected to the cooling plate, which in turn may reduce cooling effect.

In this case, since a particular part of the bottom of the exterior container is locally supported by the separator, there is a problem that this part in contact with the separator may be likely to be damaged. The reason is that the weight per area of the part in contact with the separator is increased.

The present invention is aimed at solving the problems in the conventional power supply devices. It is a main object of the present invention to provide a power supply device that can prevent a welded part from protruding from the bottom surface of a rectangular battery cell whereby stably fixedly arranging the rectangular battery cells on an exterior case or a cooling plate in proper positions, and can reliably cover the bottom surface of the rectangular battery cell with an electrically insulating film whereby effectively preventing short circuit between exterior containers of the rectangular battery cell adjacent to each other and leakage of current, and to provide a vehicle including this power supply device.

SUMMARY OF THE INVENTION

A power supply device according to the present invention includes a plurality of rectangular battery cells 1, and a holding portion 6 that holds the plurality of rectangular battery cells 1 with the rectangular battery cells 1 being arranged side by side. The rectangular battery cell 1 includes a rectangular exterior container 11, and an electrically insulating film 2. The exterior container 11 has a top surface 11A, a bottom surface 11B, a pair of main surfaces 11C, and side surfaces 11D. The electrically insulating film 2 covers the main surfaces 11C, the side surfaces 11D, and the bottom surface 11B of the exterior container 11. The electrically insulating film 2 is formed from a sheet of electrically insulating film that has main, bottom and side surface covering portions 21, 22, and 23. The main, bottom and side surface covering portions 21, 22, and 23 are continuously arranged, and cover the main, bottom and side surfaces 11C, 11B, and 11D of the exterior container 11, respectively. The electrically insulating film 2 is shaped so that the bottom surface covering portion 22 is arranged between the pair of main surface covering portions 21, and the side surface covering portions 23 protrude from the both sides of the main surface covering portions 21 and the bottom surface covering portion 22, which are continuously arranged. Each of the side surface covering portions 23 has first side surface covering portions 23A, and a second side surface covering portion 23B. The first side surface covering portions 23A protrude from the side edges of the main surface covering portions 21. The second side surface covering portion 23B protrudes outward of the bottom surface covering portion 22. The first and second side surface covering portions 23A and 23B are not separated from the both side edges of the main and bottom surface covering portions 21 and 22 so that the first and second side surface covering portions are continuously arranged in connection areas 24 between the first and second side surface covering portions. The bottom and main surface covering portions 22 and 21 of the electrically insulating film 2 are folded inward at the boundary lines L1 between the bottom and main surface covering portions so that the bottom and main surface covering portions 22 and 21 cover the bottom and main surfaces 11B and 11C of the exterior container 11, respectively. The second and bottom surface covering portions 23B and 22 are folded inward at the boundary lines L2 between the second and bottom surface covering portions. The first and main surface covering portions 23A and 21 are folded inward at the boundary lines L3 between the first and main surface covering portions. The first and second side surface covering portions 23A and 23B are folded in parts in proximity to the connection area 24 between the first and second side surface covering portions 23A and 23B so that the first and second side surface covering portions are superposed on one another on the side surfaces 11D of the exterior container 11. The superposed parts 25 are welded and made watertight. The first and second side surface covering portions 23A and 23B cover the side surfaces 11D of the exterior container 11. The plurality of rectangular battery cells 1 are arranged side by side and held by the holding portion 6 so that the bottom surfaces 11B of the plurality of rectangular battery cells 1 are aligned coplanar with each other.

The power supply device can prevent a welded part from protruding from the bottom surface of a rectangular battery cell, which are arranged side by side, whereby stably fixedly arranging the rectangular battery cells on an exterior case or a cooling plate in proper positions, and reliably covers the bottom surface of the rectangular battery cell with an electrically insulating film whereby effectively preventing short circuit between exterior containers of the rectangular battery cell adjacent to each other and leakage of current. The reason is that the electrically insulating film is folded at the edges of the bottom surface of the rectangular battery cell so that the bottom surface and the main surfaces are covered by the electrically insulating film, and the both sides of the folded electrically insulating film are folded at the edges of the both side surfaces of the rectangular battery cell and superposed on one another so that the superposed parts are welded and made watertight in the thus-constructed power supply device. Although a conventional power supply device has a welded part from protruding from the bottom surface of a rectangular battery cell, the power supply device according to the present invention can prevent the welded part from protruding from the bottom surface of the rectangular battery cell, but can cover the bottom surface of the rectangular battery cell with the electrically insulating film.

In the power supply device according to the present invention, the first and second side surface covering portions 23A and 23B can be folded at folding lines 27 that are arranged in the parts in proximity to the connection area 24 between the first and second side surface covering portions 23A and 23B. The folding lines 27 extend upward from the bottom surface 11B of the exterior container 11.

According to the thus-constructed power supply device, since the folding lines extend upward, it is possible to more reliably prevent that water comes into the interior side from the exterior side of the electrically insulating film through the folding line.

In a power supply device according to the present invention, the first side surface covering portion 23A can include a wide side surface covering portion 23a, and a narrow side surface covering portions 23b. The wide side surface covering portion 23a has a larger protruding width protruding from the main surface covering portion 21. The narrow side surface covering portions 23b has a smaller protruding width protruding from the main surface covering portion 21. The wide side surface covering portion 23a is partially superposed on the narrow side surface covering portion 23b and the second side surface covering portion 23B. The superposed part 25 is welded and made watertight. The side surface 11D of the exterior container 11 is covered with the wide side surface covering portion 23a, the narrow side surface covering portion 23b, and the second side surface covering portion 23B.

According to the thus-constructed power supply device, it is possible to minimize waste and effectively use the electrically insulating film when the rectangular battery cell is watertightly covered with the electrically insulating film. The reason is that the first side surface covering portion that covers the side surface of the rectangular battery cell does not protrude long from the bottom surface covering portion, but the side surface of the exterior container can be covered with the long and narrow first side surface covering portion that has a small protruding width.

In a power supply device according to the present invention, the protruding width (W4) of the narrow side surface covering portion 23b can be equal to the protruding width (W5) of the second side surface covering portion 23B. The protruding width (W3) of the wide side surface covering portion 23a can be substantially equal to the width (D) of the side surface of the exterior container 11. The narrow side surface covering portion 23b and the second side surface covering portion 23B are continuously arranged at the boundary line that has the same length as the protruding width of the narrow and second side surface covering portions.

According to the thus-constructed power supply device, the electrically insulating film for covering the rectangular battery cell can be easily formed by cutting an electrically insulating film material into a simple shape. In addition to this, it is possible to minimize waste when the electrically insulating film is used for covering the exterior container. The reason is that the narrow side surface covering portion and the second side surface covering portion can be formed by cutting an electrically insulating film material along straight lines so that the side surface of the exterior container can be covered.

In a power supply device according to the present invention, the narrow and second side surface covering portions 23b and 23B can be folded in the boundary part between the narrow and second side surface covering portions so that the narrow and second side surface covering portions are superposed on one another on the surface of the exterior container 11. The wide and second side surface covering portions 23a and 23B can be folded in the boundary part between the wide and second side surface covering portions so that the wide and second side surface covering portions are superposed on one another on the surface of the exterior container 11. The superposed parts 25 can be welded and made watertight.

In a power supply device according to the present invention, the protruding width (W5) of the second side surface covering portion 23B can be equal to the length (L) of the first side surface covering portion 23A. the first and second side surface covering portions 23A and 23B can be superposed on one another on the side surface 11D of the exterior container 11. The superposed part can be made watertight.

In a power supply device according to the present invention, the first side surface covering portion 23A can include a main-surface-side covering portion 23x, and a side-surface-side covering portion 23y. The main-surface-side covering portion 23x protrudes from the side edge of the main surface covering portion 21. The side-surface-side covering portion 23y protrudes from the boundary edge of the second side surface covering portion 23B in the connection area 24 between the first and second side surface covering portions 23A and 23B. the protruding widths (W6, W7) of the main-surface-side and side-surface-side covering portions 23x and 23y can be narrower than the width (D) of the side surface 11D of the exterior container 11.

The main-surface-side and side-surface-side covering portions 23x and 23y can be folded in the boundary part between the main-surface-side and side-surface-side covering portions, and be superposed on one another.

According to the thus-constructed power supply device, the maximum number of layers of the superposed part of the electrically insulating film can be three after the electrically insulating film is folded so that parts of the electrically insulating film are superposed one another. As a result, the superposed part can be more stably welded and made watertight.

In a power supply device according to the present invention, the protruding width (W6) of the main-surface-side covering portion 23x can be equal to the protruding width (W7) of the side-surface-side covering portion 23y.

In a power supply device according to the present invention, the electrically insulating film 2 can be formed from a heat contraction film.

According to the thus-constructed power supply device, the electrically insulating film can be brought in tight contact with the surface of the exterior container. As a result, it is possible to suppress that water is condensed between the exterior container and the electrically insulating film. The reason is that air can be reduced which remains between the electrically insulating film and the exterior container so that the amount of moisture contained in the air layer can be reduced.

In a power supply device according to the present invention, a cooling plate 7 can be further provided which is thermally connected and fastened to the bottom surfaces 11B of the rectangular battery cell 1 so that the rectangular battery cells 1 can be forcedly cooled by the cooling plate 7.

According to the thus-constructed power supply device, the rectangular battery cells can be watertightly covered, while the rectangular battery cells can be more efficiently cooled by the cooling plate. The reason is that the bottom surfaces of the exterior containers of the rectangular battery cells can be thermally connected through small thermal resistivity to the cooling plate.

The aforementioned power supply device according to the present invention can be used as a vehicle power supply device.

The aforementioned power supply device according to the present invention can be used as a power storage type power supply device.

A vehicle according to the present invention can include any of the aforementioned power supply devices.

The above and further objects of the present invention as well as the features thereof will become more apparent from the following detailed description to be made in conjunction with the accompanying drawings.

DETAILED DESCRIPTION OF THE EMBODIMENT(S)

The following description will describe embodiments according to the present invention with reference to the drawings. It should be appreciated, however, that the embodiments described below are illustrations of a power supply device and a vehicle including this power supply device to give a concrete form to technical ideas of the invention, and a power supply device and a vehicle including this power supply device of the invention are not specifically limited to description below. Furthermore, it should be appreciated that the members shown in claims attached hereto are not specifically limited to members in the embodiments. Unless otherwise specified, any dimensions, materials, shapes and relative arrangements of the members described in the embodiments are given as an example and not as a limitation. Additionally, the sizes and the positional relationships of the members in each of drawings are occasionally shown larger exaggeratingly for ease of explanation. Members same as or similar to those of this invention are attached with the same designation and the same reference signs, and their description is omitted. In addition, a plurality of structural elements of the present invention may be configured as a single part that serves the purpose of a plurality of elements, on the other hand, a single structural element may be configured as a plurality of parts that serve the purpose of a single element. Also, the description of some of examples or embodiments may be applied to other examples, embodiments or the like.

A power supply device according to the present invention can be used as a power supply including a plurality of rectangular battery cells that are connected to each other for increasing the output, in particular as a power supply device that can be installed on electric vehicle such as hybrid car and electric car and can supply electric power to an vehicle-driving electric motor for vehicle traveling, a power supply device that can be charged with electric power generated by natural power sources such as solar batteries or with midnight electric power, or a power supply device suitable as blackout backup power supplies that are suitably prepared for a blackout.

Figure 1:
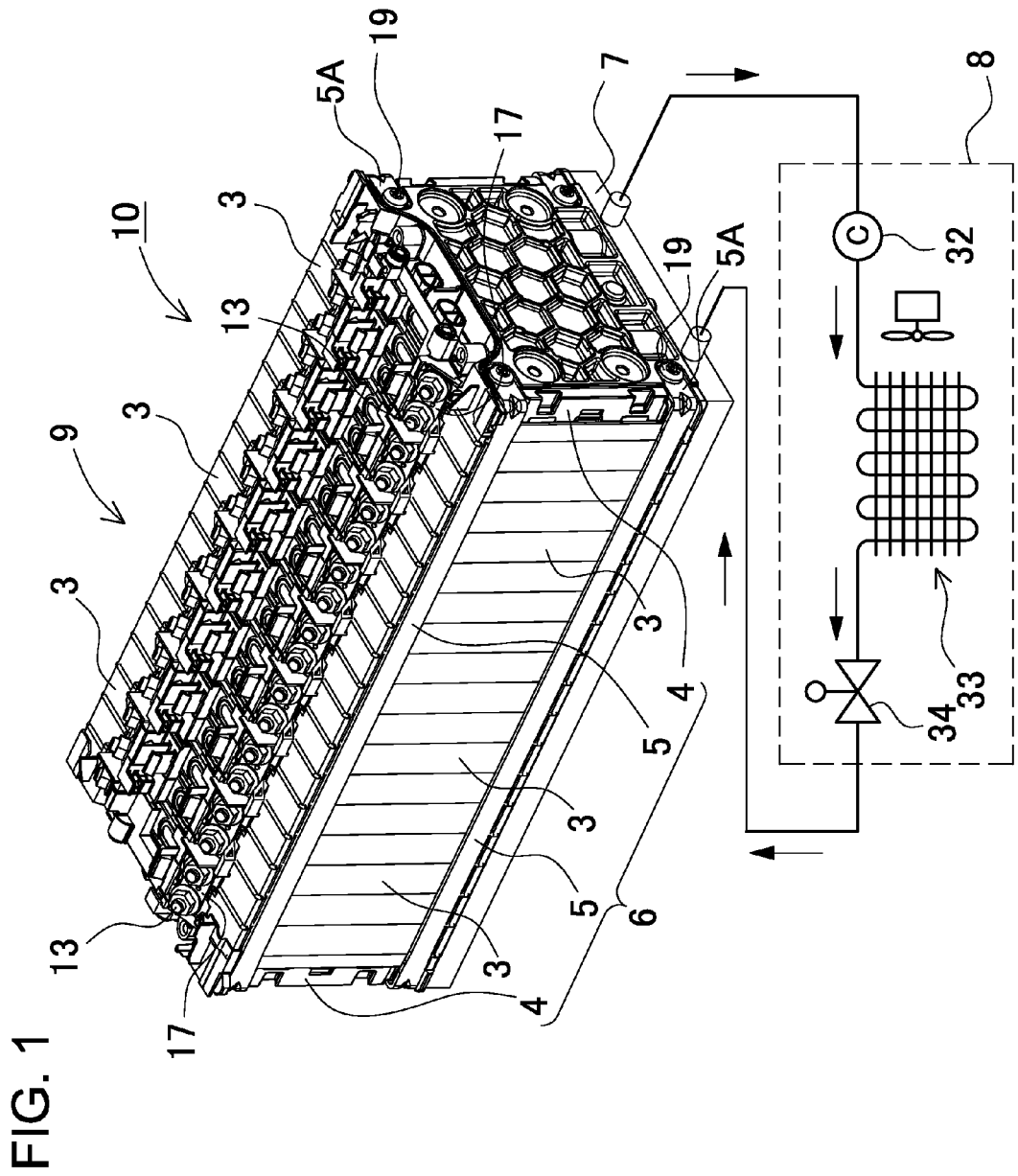
FIG. 1 is a perspective view of a power supply device according to an embodiment of the present invention.
Figure 2:
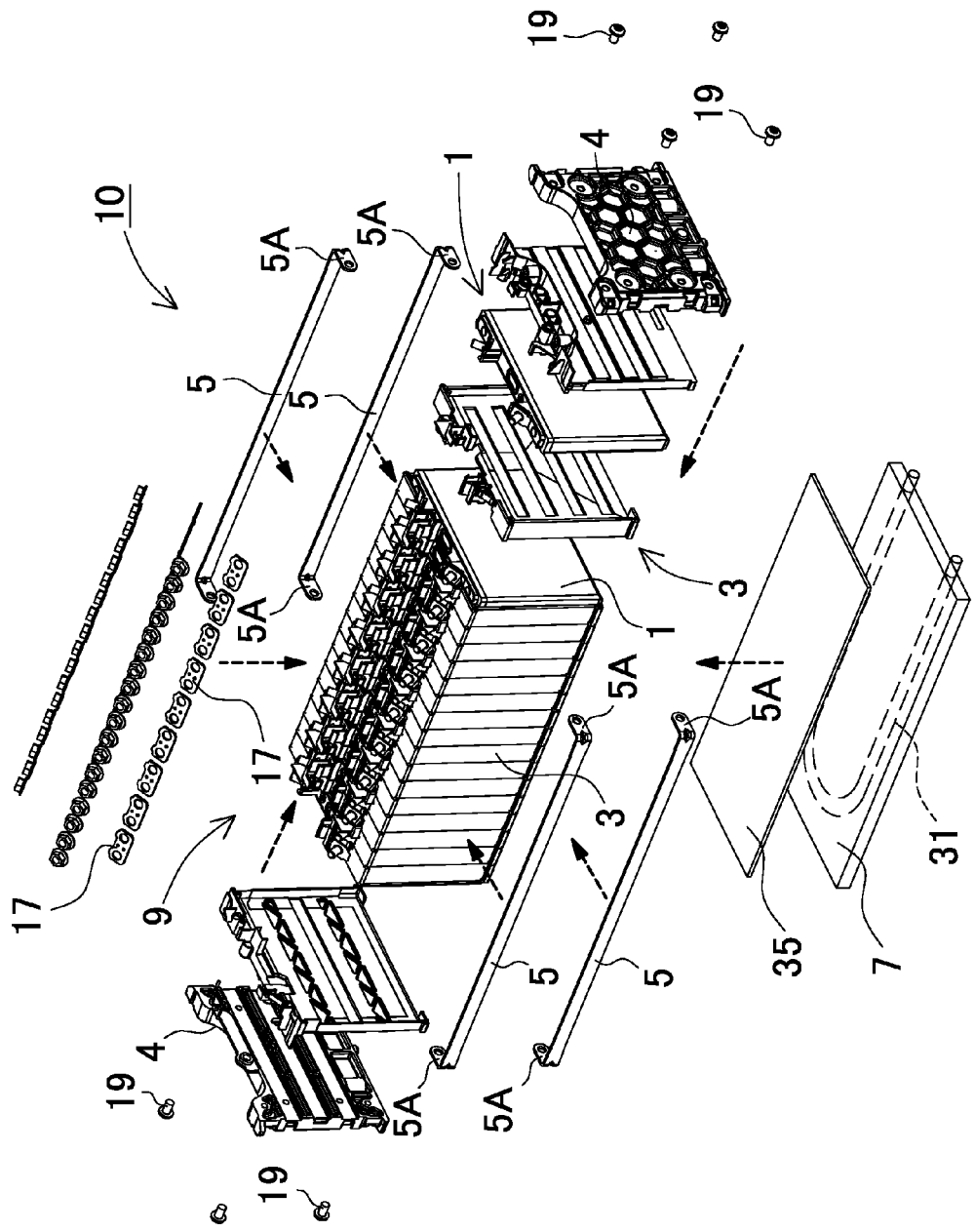
FIG. 2 is an exploded perspective view of the power supply device shown in FIG. 1.

A power supply device shown in FIGS. 1 and 2 includes a plurality of rectangular battery cells 1 having an exterior shape the thickness of which is smaller than the width. A battery assembly 9 is constructed of the rectangular battery cells 1. The battery assembly 9 is held by holding portions 6 with the rectangular battery cells 1 being arranged side by side. A battery block 10 is constructed of the battery assembly 9, and a cooling plate 7. The battery assembly 9 is placed on the cooling plate 7. In the power supply device, the rectangular battery cells 1 can be forcedly cooled by the cooling plate 7.

The holding portions 6 include a pair of end plates 4, and bind bars 5. The battery assembly 9 is sandwiched from the both end surface sides between the end plates 4. The bind bars 5 couple the end plates 4 to each other. In the battery assembly 9, as shown in the exploded perspective view of FIG. 2, separators 3 are interposed between the rectangular battery cells 1. In the battery block 10 shown in FIG. 2, eighteen rectangular battery cells 1 are arranged side by side. The bind bar 5 has bent parts 5A that are formed by bending a metal plate, and arranged on the both ends of the bind bar. Thus, the bind bar has a roughly rectangular U shape. In addition, the end plate 4 has recessed parts that are arranged at positions for receiving the bent parts 5A of the bind bars 5. The bent parts 5A have through holes, while the end plates 4 have threaded holes. Thus, fastening screws 19 can be screwed into the threaded holes so that the bind bars 5 can be fastened to the end plates 4.

(Battery Assembly 9)

In the battery assembly 9 shown in FIGS. 1 and 2, electrode terminals 13 of the rectangular battery cells 1 adjacent to each other are connected to each other by bus bars 17. In the case where the rectangular battery cells 1 are serially connected to each other, the output voltage of the battery assembly 9 can be high. In the case where the rectangular battery cells 1 are connected in parallel to each other, the output current of the battery assembly 9 can be large. In the case where the rectangular battery cells 1 of the battery assembly 9, which are arranged side by side, have metal exterior containers, the separators 3 to be interposed between the rectangular battery cells 1 are formed of an electrically insulating material so that the rectangular battery cells 1 are electrically insulated from each other when the rectangular battery cells 1 of the battery assembly 9 are arranged side by side. In the case where the exterior containers of the rectangular battery cells of the battery assembly to be arranged side by side are formed of an electrically insulating material such as plastic, the separators can be formed from metal plates. In this case, alternatively, the rectangular battery cells can be arranged side by side without separators interposed between the rectangular battery cells.

(Separator 3)

In the battery assembly 9, the separators 3 are interposed between the rectangular battery cells 1, which are arranged side by side. In the battery assembly 9 according to this embodiment, the exterior container of the rectangular battery cell 1 is formed of metal. The separator 3 is formed of plastic, and electrically insulates one rectangular battery cell 1 from another. The separator 3 has a shape that allows the rectangular battery cells 1 to fit in the both surface sides of the separator. As a result, it is possible to prevent that the rectangular battery cells 1 adjacent to the separator 3 are deviated from the predetermined positions when the rectangular battery cells 1 are arranged side by side. Note that, in the case where the exterior containers of the rectangular battery cells of the battery assembly are formed of an electrically insulating material such as plastic, the rectangular battery cells can be arranged side by side and held by the holding portions without the separators interposed between the rectangular battery cells.

(Cooling Plate 7)

In the power supply device shown in FIGS. 1 and 2, the rectangular battery cells 1 can be cooled by the cooling plate 7. In the illustrated power supply device, the cooling plate 7 is arranged on the bottom surface of the battery assembly 9 so that the rectangular battery cells 1 can be cooled from the bottom surfaces. The cooling plate 7 is cooled by a cooling mechanism 8, and forcedly cools the rectangular battery cells 1. In the battery block 10 shown in FIG. 2, in order that the cooling plate 7 can be thermally connected to the rectangular battery cells 1, an electrically insulating and thermally conductive sheet 35 is arranged between the bottom surfaces of the rectangular battery cells 1 and the cooling plate 7. The electrically insulating thermally conductive sheet 35 is compressed between the rectangular battery cells 1 and the cooling plate 7, and elastically deformed. As a result, the electrically insulating thermally conductive sheet 35 comes in surface contact with the bottom surfaces of the rectangular battery cells 1 and the surface of the cooling plate 7.

A coolant path 31 is formed inside the cooling plate 7. A coolant can circulate through the coolant path 31. The coolant (e.g., Freon, or carbonic acid gas) is supplied in a liquid state to the coolant path 31, and cools the cooling plate 7 by heat of vaporization when the coolant evaporates inside the cooling plate 7. The coolant path 31 of the cooling plate 7 is connected to the cooling mechanism 8.

The cooling mechanism 8 includes a compressor 32, a cooling heat exchanger 33, and an expansion valve 34. The compressor 32 pressurizes the coolant that is evaporated in the coolant path 31. The cooling heat exchanger 33 cools and liquefies the coolant that is compressed by the compressor 32. The expansion valve 34 supplies the coolant path 31 with the coolant that is liquefied by the cooling heat exchanger 33. The liquefied coolant that is supplied through the expansion valve 34 is evaporated in the coolant path 31 of the cooling plate 7 so that the cooling plate 7 is cooled by heat of vaporization, and is then discharged to the cooling mechanism 8. Thus, the coolant circulates through the coolant path 31 of the cooling plate 7 and the cooling mechanism 8 so that the cooling plate 7 can be cooled. Although the cooling mechanism 8 has been described to cool the cooling plate 7 to a low temperature by using heat of vaporization of the coolant, the cooling plate may be cooled not by using heat of vaporization. For example, the coolant path of the cooling plate can be supplied with a coolant such as brine that is cooled to a low temperature so that the cooling plate is directly cooled not by using heat of vaporization of a coolant but by the low-temperature coolant.

The cooling mechanism 8 controls the cooled state of the cooling plate 7 by using a temperature sensor (not shown) that detects a temperature on the rectangular battery cell 1. That is, if a temperature on the rectangular battery cell 1 becomes higher than a predetermined cooling start temperature, the cooling mechanism supplies the coolant to the cooling plate 7 so that the cooling plate 7 can be cooled. If a temperature on the rectangular battery cell 1 becomes lower than a predetermined cooling stop temperature, the cooling mechanism stops supplying the coolant to the cooling plate 7. As a result, the cooling mechanism can adjust the temperature of the rectangular battery cell 1 within a predetermined temperature range.

Figure 3:
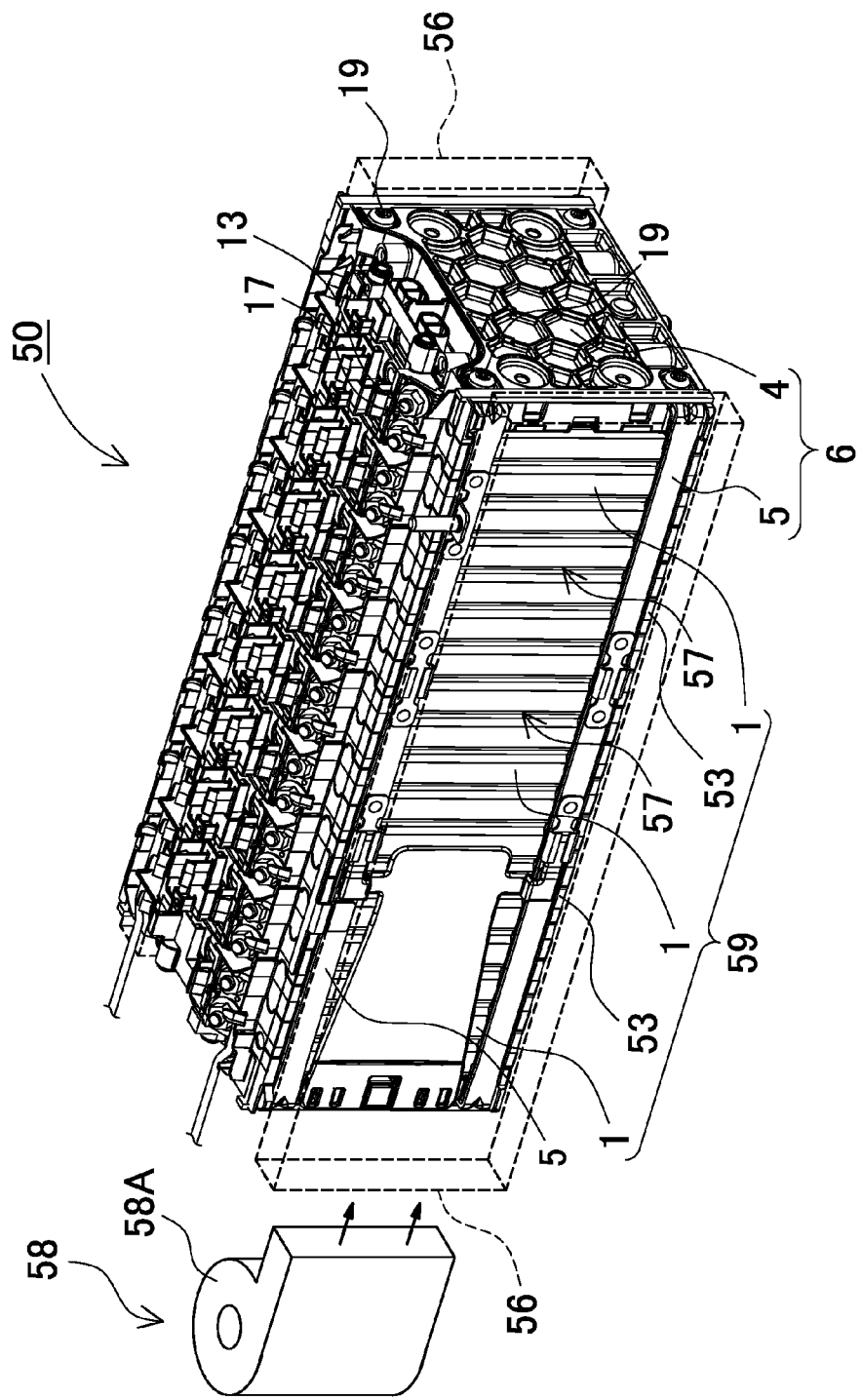
FIG. 3 is a perspective view of a power supply device according to another embodiment of the present invention.
Figure 4:
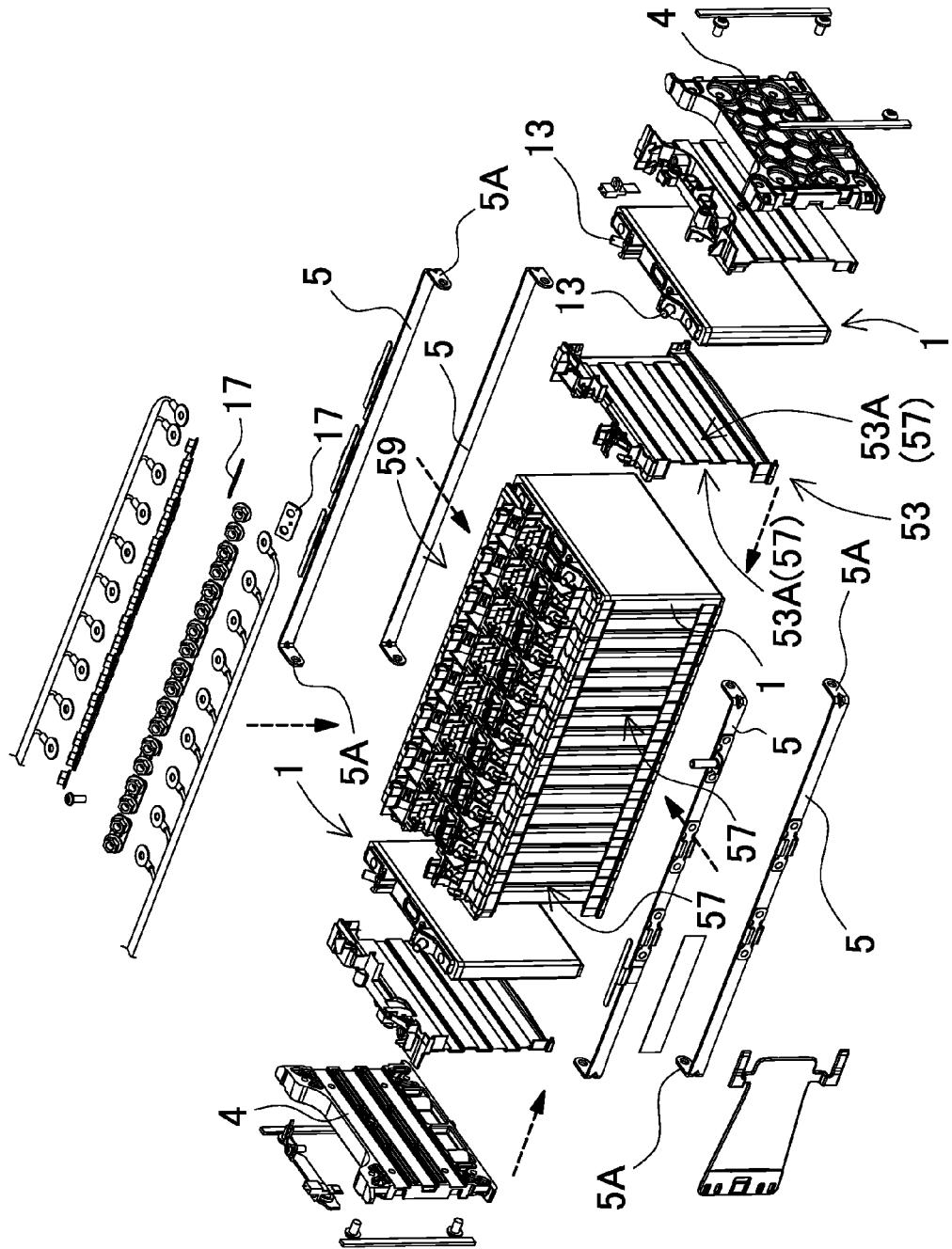
FIG. 4 is an exploded perspective view of the power supply device shown in FIG. 3.

On the other hand, the power supply device does not necessarily cool the rectangular battery cell by using the cooling plate. As shown in FIG. 3 and FIG. 4, the gas-flowing gaps 57 may be formed between the rectangular battery cells 1, which are arranged side by side. Cooling gas can be forcedly blown to the gas-flowing gaps 57 so that the rectangular battery cells 1 of the battery block 50 can be cooled by the cooling gas. In a battery assembly 59 shown in FIG. 4, gas-flowing grooves 53A are formed on the both surface sides of a separator 53 that is interposed between the rectangular battery cells 1. The gas-flowing grooves 53A form the gas-flowing gaps 57 between the rectangular battery cell 1 and the separator 53. The gas-flowing grooves 53A of the separator 53 horizontally extend. In other words, the both sides of the rectangular battery cell 1 are connected by the gas-flowing grooves 53A. Thus, the cooling gas horizontally flows through the gas-flowing gaps 57 that are formed on the separator 53 so that the rectangular battery cell 1 can be cooled. The illustrated separator 53 has a fit-in structure that allows the rectangular battery cells 1 to fit in the both surface sides of the separator 53. As a result, it is possible to prevent that the rectangular battery cells 1 adjacent to the separator 53 are deviated from the predetermined positions when the rectangular battery cells 1 are arranged side by side.

In addition, the power supply device shown in FIG. 3 includes a cooling mechanism 58 that forcedly flows the cooling gas through the gas-flowing gaps 57 of the battery assemblies 59 so that the rectangular battery cells 1 can be cooled. The illustrated power supply device includes a forcedly-gas-blowing mechanism 58A as the cooling mechanism 58 that forcedly blows the cooling gas. In addition, in order to forcedly blow the cooling gas to the gas-flowing gaps 57 from the forcedly-gas-blowing mechanism 58A, the power supply device shown in FIG. 3 includes the air ducts 56 that are arranged along the side surfaces of the battery block 50. In this power supply device, the cooling gas is forcedly blown through the air duct 56 toward the gas-flowing gaps 57 by the forcedly-gas-blowing mechanism 58A. After that, the cooling gas can flow through the gas-flowing gaps 57 so that the rectangular battery cells 1 can be cooled.

(Rectangular Battery Cell 1)

The rectangular battery cells 1 are lithium-ion rechargeable batteries. However, any rechargeable batteries such as nickel metal hydride batteries and nickel-cadmium batteries can be used as the rectangular battery cells. The rectangular battery cell 1 shown in FIG. 5 has a predetermined thickness, and rectangular main surfaces 11C. The rectangular battery cell 1 includes positive/negative electrode terminals 13 that protrude from the end parts of a top surface 11A of the rectangular battery cell 1, and an opening 16 for a safety valve 15 that is located in the middle of the top surface 11A of the rectangular battery cell 1. The positive/negative electrode terminals 13 of the adjacent rectangular battery cells 1, which are arranged side by side adjacent to each other, are serially connected to each other by the bus bars 17. In the case of the battery system in that adjacent rectangular battery cells 1 are serially connected to each other, the output voltage of the battery system can be high, and as a result the battery system can provide high power. However, in the battery system according to the present invention, adjacent rectangular batteries may be connected in parallel to each other.

(Electrically Insulating Film 2)

The surfaces other than the top surface 11A of the rectangular battery cell 1 are covered and electrically insulated by the electrically insulating film 2. Specifically, the surfaces other than the top surface 11A of the rectangular battery cell 1 are covered with the electrically insulating film 2. It is preferable that the electrically insulating film 2 entirely cover the main surfaces 11C, side surfaces 11D, and a bottom surface 11B of the exterior container of the battery cell. However, the electrically insulating film may cover the whole bottom surface, and parts of the main surface and the side surfaces other than the upper parts of the main surface and the side surfaces. Alternatively, the electrically insulating film may cover the whole bottom surface, and bottom parts of the main surface and the side surfaces. The reason is that, in the case where the bottom parts of the rectangular battery cell 1 are covered with the electrically insulating film, it is possible to prevent short circuit and leakage of current caused by water that may be condensed and run on the surface of the exterior container. The top surface 11A is not covered with the electrically insulating film 2. The reason is that the electrode terminals 13 are required to be exposed for electric connection. The electrically insulating film 2 is formed by cutting an electrically insulating film material into a predetermined exterior shape. After the surfaces of the exterior container 11 are covered with the electrically insulating film 2 of heat contraction film, the electrically insulating film 2 is heated and contracted by the heat so that the electrically insulating film 2 is brought into tight contact with the surfaces of the exterior container 11.

Figure 36A:
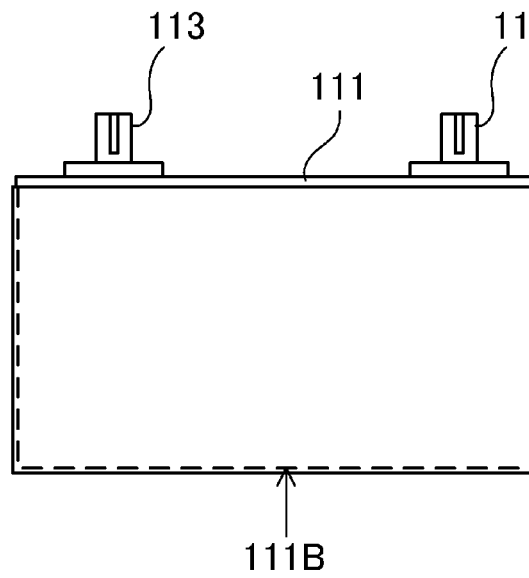
FIGS. 36A-36C are three-view drawings of the rectangular battery cell shown in FIG. 35 that is covered with a conventional electrically insulating film.
Figure 36C:
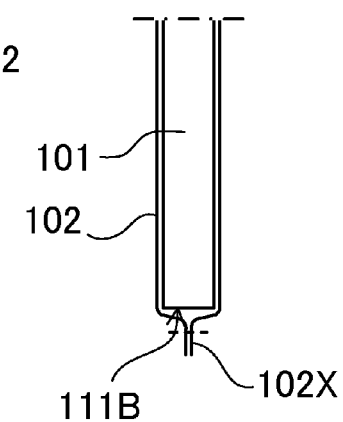
Figure 36B:
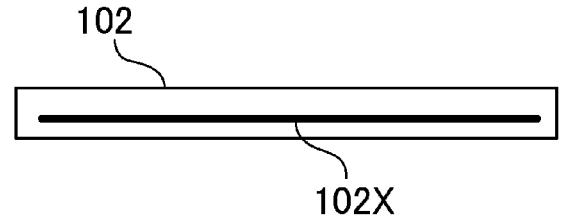
Figure 37:
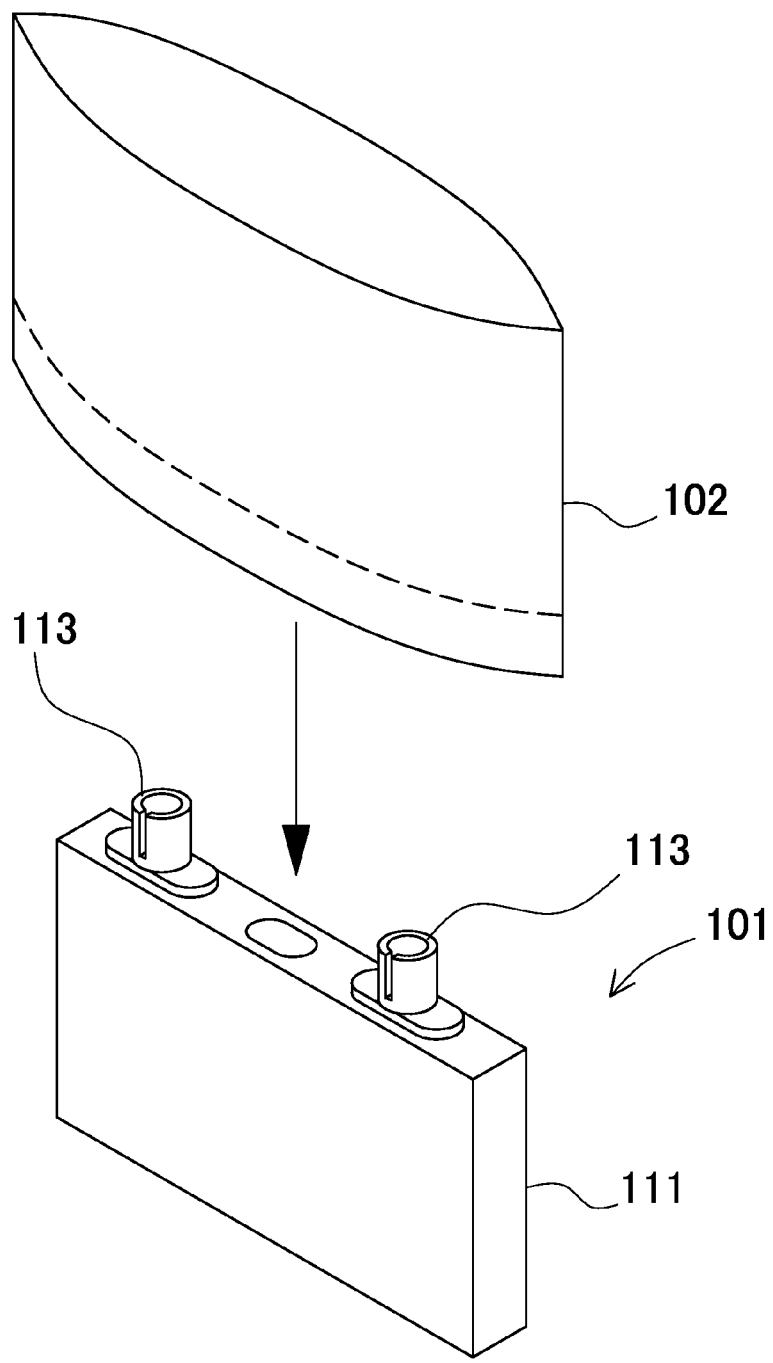
FIG. 37 is a perspective view showing the process for covering the rectangular battery cell shown in FIG. 35 with the conventional electrically insulating film.
Figure 38A:
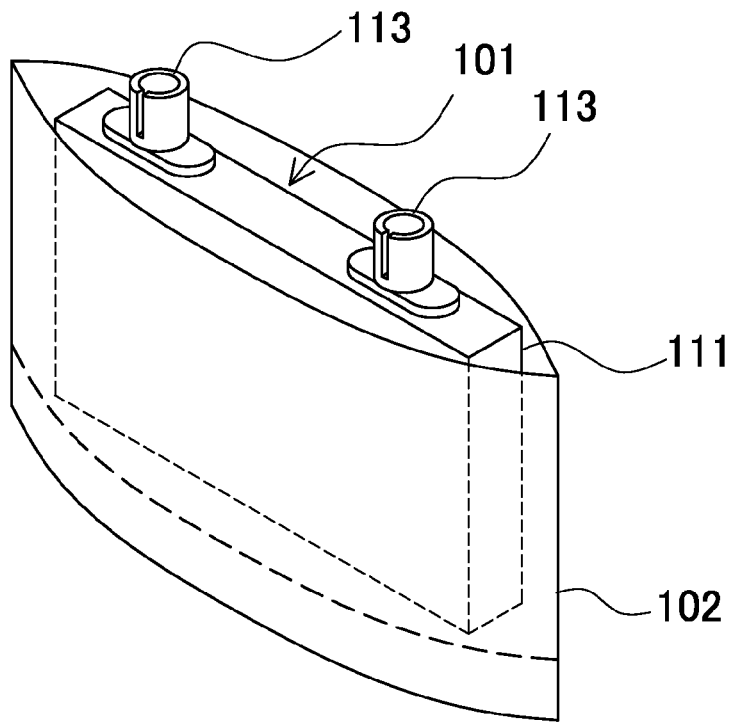
FIGS. 38A and 38B are perspective views showing the rectangular battery cell, which is covered with the heat contraction sheet as shown in FIG. 37, before and after heat contraction.
Figure 38B:
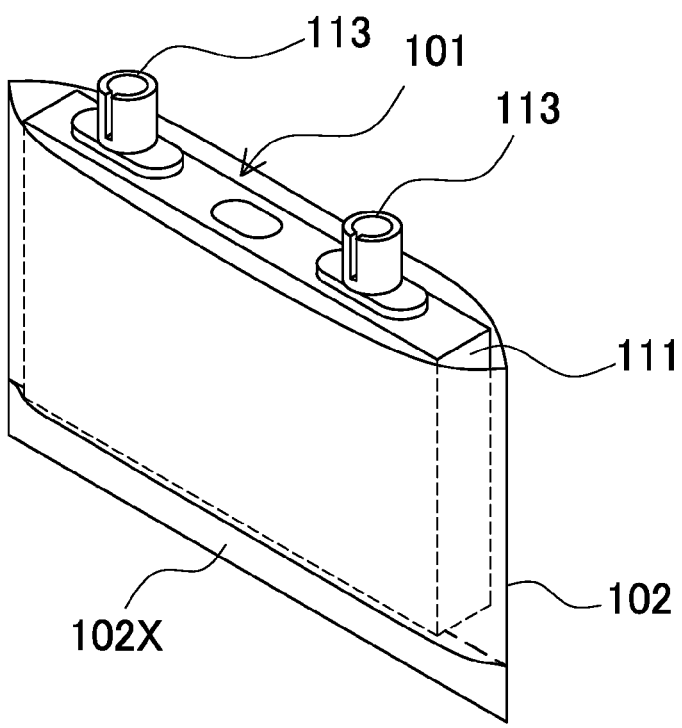
Figure 39A:
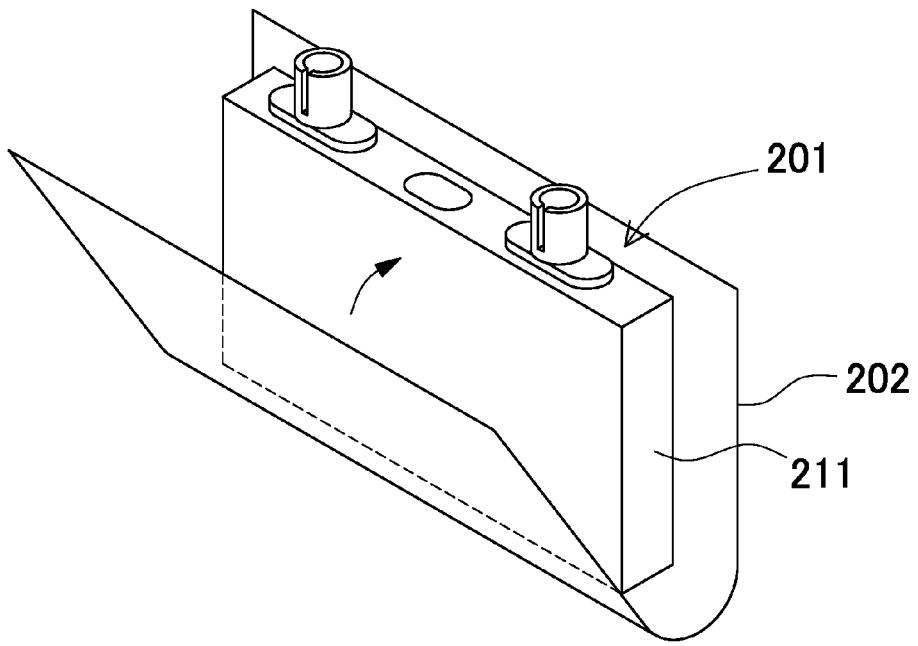
FIGS. 39A-39B are a perspective view showing other processes for covering the rectangular battery cell with another conventional electrically insulating film.
Figure 39B:
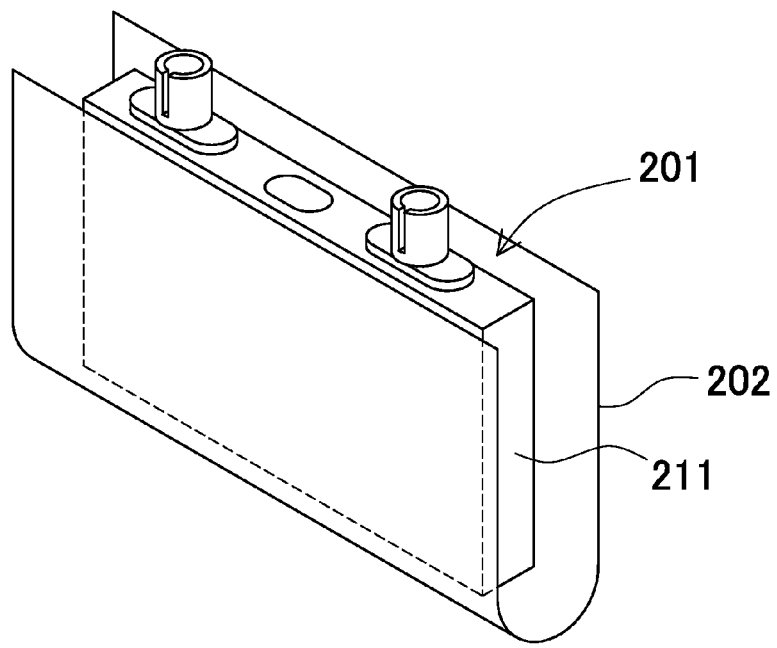
Figure 40:
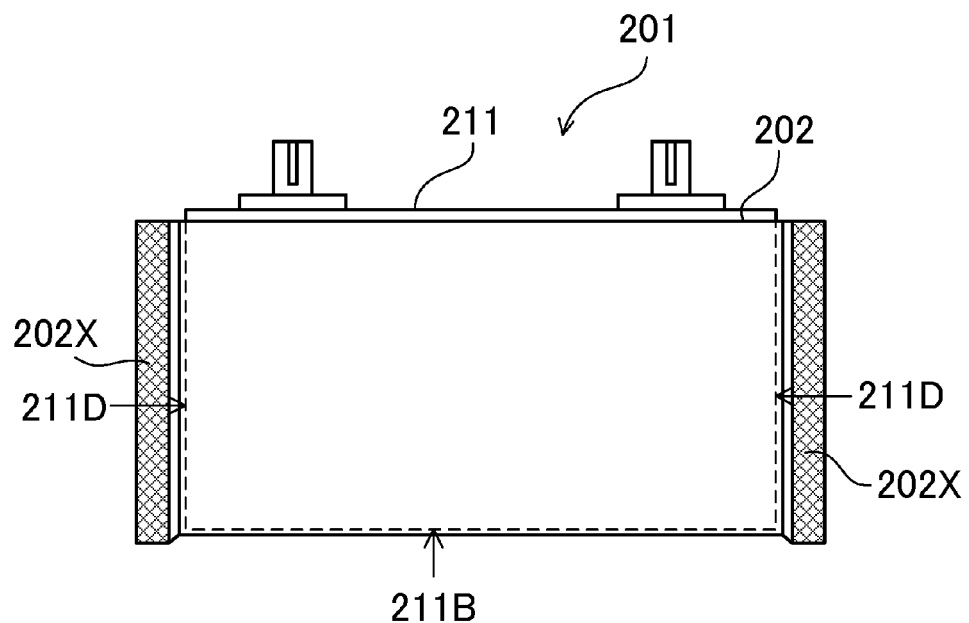
FIG. 40 is a front view showing the rectangular battery cell that is covered with the electrically insulating film shown in FIGS. 39A-39B.

In the case where the surfaces of the rectangular battery cell 1 are covered with the electrically insulating film 2 so that the surfaces of the rectangular battery cell 1 are electrically insulated, it is important that the bottom surface 11B of the rectangular battery cell 1 is flat. In the conventional construction where, after the rectangular battery cell is inserted into a tube-shaped heat contraction sheet that has opened upper and lower ends, the bottom surface of the sheet is welded by heat, as shown in FIGS. 36A-36C, a heat welded part 102x protrudes from a bottom surface 111B of an exterior container 111. In order to solve the problem that the heat welded part protrudes from the bottom surface of the exterior container, it can be conceived that, after a sheet-shaped heat contraction film 202 is bent into a U shape, and a rectangular battery cell 201 is accommodated inside the bent heat contraction film 202, the both sides of the heat contraction film 202 are welded by the heat as shown in FIGS. 39 and 40. However, according to this construction, there is a problem that heat welded parts 202x will protrude from the both side surfaces 211D of the exterior container 211, as shown in FIG. 40. These protruding parts may cause uneven alignment of the bottom surfaces 211B of the rectangular battery cells 201, and may increase thermal resistivity between the rectangular battery cells 201 and the cooling plate.

To address this, in order to align the bottom surfaces 11B of the exterior containers 11 coplanar with each other, in the rectangular battery cell 1 of the power supply device of the present invention, as shown in FIGS. 6 to 24, the electrically insulating film 2 is folded on the side surfaces 11D of the exterior container 11 so that parts of the electrically insulating film 2 are superposed on one another. Thus-formed superposed parts 25 that are formed on the side surfaces 11D of the exterior container 11 are welded by heat and made watertight.

The electrically insulating films 2 shown in developed views of FIGS. 6, 13, 17 and 21 are formed from a sheet of electrically insulating film that has main, bottom and side surface covering portions 21, 22, and 23. The main, bottom and side surface covering portions 21, 22, and 23 are continuously arranged, and cover the main, bottom and side surfaces 11C, 11B, and 11D of the exterior container 11, respectively. The electrically insulating film 2 is shaped so that the bottom surface covering portion 22 is arranged between the pair of main surface covering portions 21, and the side surface covering portions 23 protrude from the both sides of the main surface covering portions 21 and the bottom surface covering portion 22, which are continuously arranged. The side surface covering portions 23 includes first and second side surface covering portions 23A and 23B. The first side surface covering portions 23A are arranged on the both sides of the main surface covering portion 21, and protrude outward of the side edges of the main surface covering portion 21. The second side surface covering portions 23B are arranged on the both sides of the bottom surface covering portion 22, and protrude outward of the side edges of the bottom surface covering portion 22.

As shown in developed views of FIGS. 6, 13, 17 and 21, the first and second side surface covering portions 23A and 23B are not disconnected at the boundary between them from each other. The first and second side surface covering portions 23A and 23B are continuously arranged in connection areas 24. In the case where the first and second side surface covering portions 23A and 23B are disconnected at the boundary between them from each other, if the disconnection line extends to the intersection between the first side surface covering portion, the second side surface covering portion, the main surface covering portion, and the bottom surface covering portion, a pinhole will be likely to be formed at this intersection. Such a pinhole may allow water to pass through the electrically insulating film. That is why the first and second side surface covering portions are not disconnected at the boundary between them from each other. Since the electrically insulating film 2 has the connection areas 24, when the electrically insulating film 2 is folded at the edges of the exterior container 11, a pinhole will not be formed at the aforementioned intersection K. The reason is that the connection areas 24 can serve as an upright portion along the both side edges of the side surfaces 11D of the exterior container 11, and cover the both side edges of the side surfaces 11D of the exterior container 11.

Figure 6:
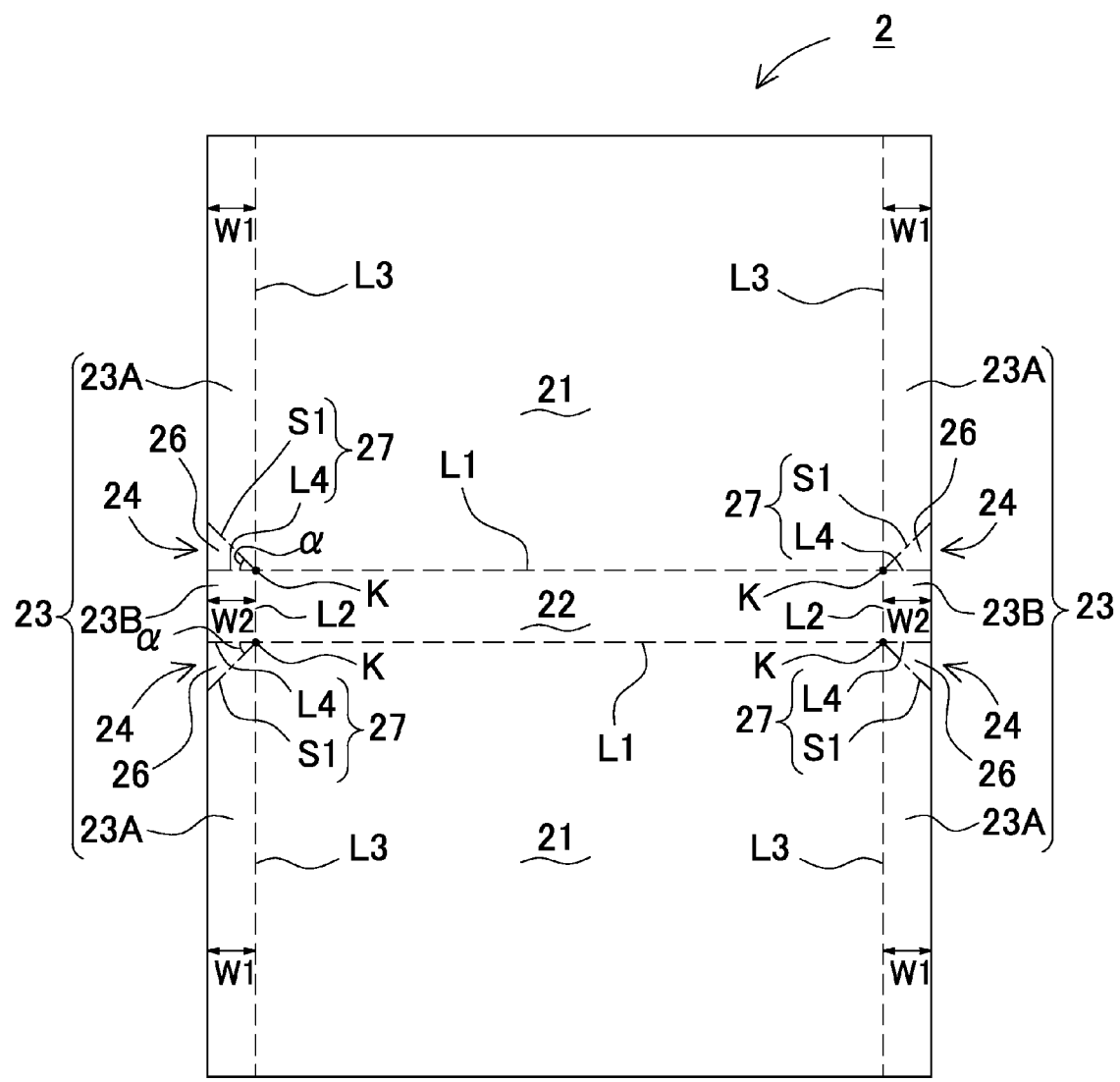
FIG. 6 is a developed view showing an exemplary electrically insulating film.
Figure 7:
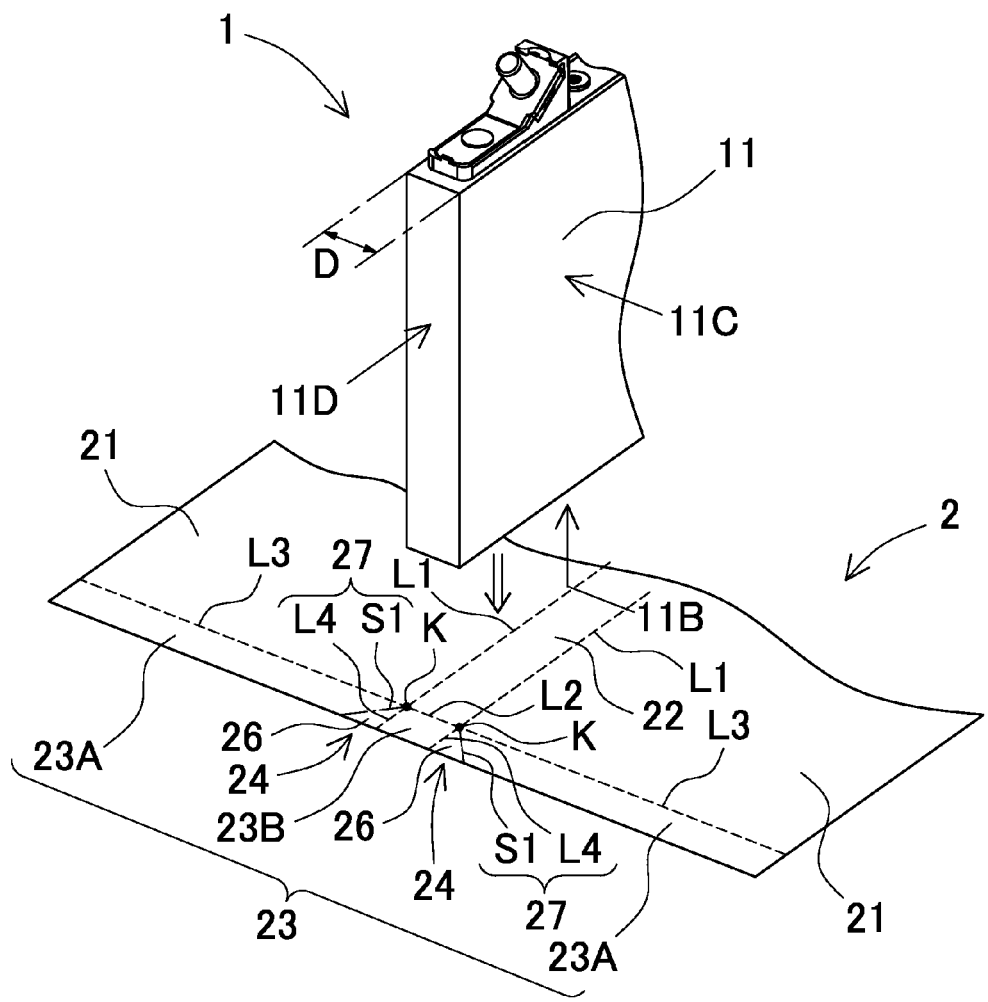
FIG. 7 is an exploded perspective view showing the process for covering the rectangular battery cell with the electrically insulating film shown in FIG. 6.
Figure 8:
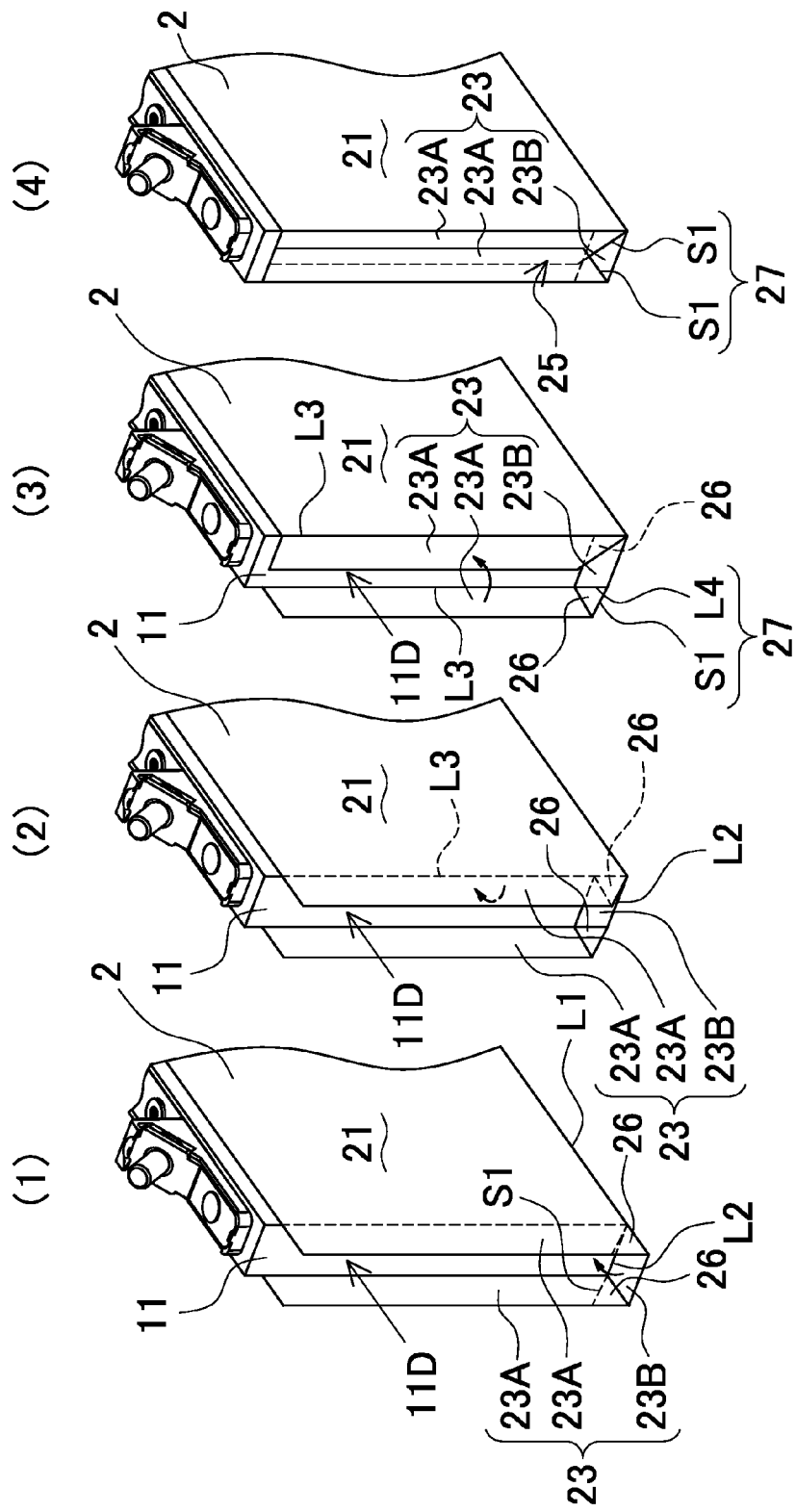
FIG. 8 is a perspective view showing the processes for covering the rectangular battery cell with the electrically insulating film shown in FIG. 6.

As shown in FIGS. 7 and 8, the bottom and main surface covering portions 22 and 21 of the electrically insulating film 2 shown in FIG. 6 are folded inward at the boundary lines L1 between the bottom and main surface covering portions 22 and 21 so that the bottom and main surface covering portions 22 and 21 cover the bottom and main surfaces 11B and 11C of the exterior container 11, respectively. The second and bottom surface covering portions 23B and 22 are folded inward at the boundary lines L2 between the second and bottom surface covering portions. The first and main surface covering portions 23A and 21 are folded inward at the boundary lines L3 between the first and main surface covering portions. The first and second side surface covering portions 23A and 23B are folded at the boundary lines L4 between the first and second side surface covering portions 23A and 23B and fold lines S1 on the first side surface covering portions 23A in parts in proximity to the connection area 24. Thus, the first and second side surface covering portions 23A and 23B are folded on the side surfaces 11D of the exterior container 11. When the first and second side surface covering portions 23A and 23B are folded on the side surfaces 11D of the exterior container 11, the first and second side surface covering portions are superposed on one another. The superposed parts 25 are pressed and heated so that the electrically insulating film 2 is welded and made watertight. Thus, the first and second side surface covering portions 23A and 23B entirely cover the side surfaces 11D of the exterior container 11.

The main surface covering portions 21 and the bottom surface covering portion 22 of the electrically insulating film 2 are folded inward at a right angle so that the main surfaces 11C and the bottom surface 11B of the exterior container 11 are covered with the electrically insulating film 2. In the illustrated electrically insulating film 2, a right-triangular folded part 26 will be formed in the boundary part between the first and second side surface covering portions 23A and 23B, in other words, in the connection area 24. The right-triangular folded part 26 can be defined by the boundary line L4 and the fold line S1. The boundary line L4 and the fold line S1 serve as folding lines 27. The folded part 26 is folded inward at one of the folding lines 27, which are the boundary line L4 and the fold line S1, while the folded part 26 is folded outward at another folding line so that the folded part 26 will be superposed on the interior-side or exterior-side surface of the first side surface covering portion 23A. In other words, the folded part 26 is folded so that the folded part 26 is sandwiched between the interior-side surface of the first side surface covering portion 23A and the exterior-side surface of the second side surface covering portion 23B, alternatively, the folded part 26 is folded so that the folded part 26 is sandwiched between the exterior-side surface of the first side surface covering portion 23A and the interior-side surface of the second side surface covering portion 23B. The folded part 26 will be welded to the first and second side surface covering portions 23A and 23B between which the folded part 26 is sandwiched. Thus, the folded part 26, the first and second side surface covering portions 23A and 23B can be made watertight.

In the electrically insulating film 2 shown in FIGS. 6 and 7, the right-triangular folded part 26 is formed in the connection area 24, which is located in the first side surface covering portion 23A, between the first and second side surface covering portions 23A and 23B. In the illustrated electrically insulating film 2, the fold line S1 extends in the first side surface covering portion 23A from the intersection K between the boundary lines L1 and L3 so that the right-triangular folded part 26 is defined. In the illustrated electrically insulating film 2, the fold line S1 is the bisector between the boundary lines L3 and L4 so that the angle α that is formed by the boundary line L4 and the fold line S1 is about 45 degrees. According to this construction, after the first and second side surface covering portions 23A and 23B are superposed on one another with the folded part 26 being sandwiched between the first and second side surface covering portions 23A and 23B, the first and second side surface covering portions 23A and 23B, the main surface covering portion 21, and the bottom surface covering portion 22 intersect perpendicularly to each other so that one corner part of the exterior container 11 is covered by the first and second side surface covering portions 23A and 23B, the main surface covering portion 21, and the bottom surface covering portion 22.

The electrically insulating film 2 of the rectangular battery cell 1 shown in FIG. 5 can cover the surfaces of the exterior container 11 in the following processes as shown in FIGS. 7 and 8.

(1) As shown in FIG. 7, the bottom surface covering portion 22 of the electrically insulating film faces the bottom surface 11B of the exterior container 11. Subsequently, the main surface covering portions 21 and the bottom surface covering portion 22 are folded inward at the boundary lines L1 between the main surface covering portions 21 and the bottom surface covering portion 22. Thus, the bottom surface 11B of the exterior container 11 is covered with the bottom surface covering portion 22, while the main surfaces 11C of the exterior container 11 are covered with the main surface covering portions 21.

(2) As shown in FIG. 8(1), the second side surface covering portion 23B is folded inward at the boundary line L2 between the second side surface covering portion 23B and the bottom surface covering portion 22. Thus, the bottom part of the side surface 11D of the exterior container 11 is covered with the second side surface covering portion 23B.

(3) As shown in FIG. 8(2), each of the folded parts 26 in the connection area 24 is folded inward (in other words, the interior-side surface of the folded part 26 is folded) at the fold line S1, which is one edge of the folded part 26, so that the interior-side surface of the folded part 26 is superposed on the interior-side surface of the first side surface covering portion 23A.

(4) As shown in FIGS. 8(3) and 8(4), each of the first side surface covering portions 23A is folded inward at the boundary line L3 between the first side surface covering portion 23A and the main surface covering portion 21, while each of the folded part 26 in the connection area 24 is folded outward at the boundary line L4 as one edge of the folded part 26 (in other words, the exterior-side surface of the folded part 26 is folded so that the exterior-side surface of the folded part 26 is superposed on the exterior-side surface of the second side surface covering portion 23B), so that the side surface 11D of the exterior container 11 is covered with the first side surface covering portions 23A.

(5) After the first and second side surface covering portions 23A and 23B are folded on the side surfaces 11D of the exterior container 11 so that the first and second side surface covering portions are superposed on one another, the superposed parts 25 are welded and made watertight. Thus, the first and second side surface covering portions 23A and 23B cover the side surfaces 11D of the exterior container 11.

For example, a welding plate of a heater (not shown) is pressed onto the superposed part 25 of the first and second side surface covering portions 23A and 23B so that the superposed part 25 can be welded.

Figure 5:
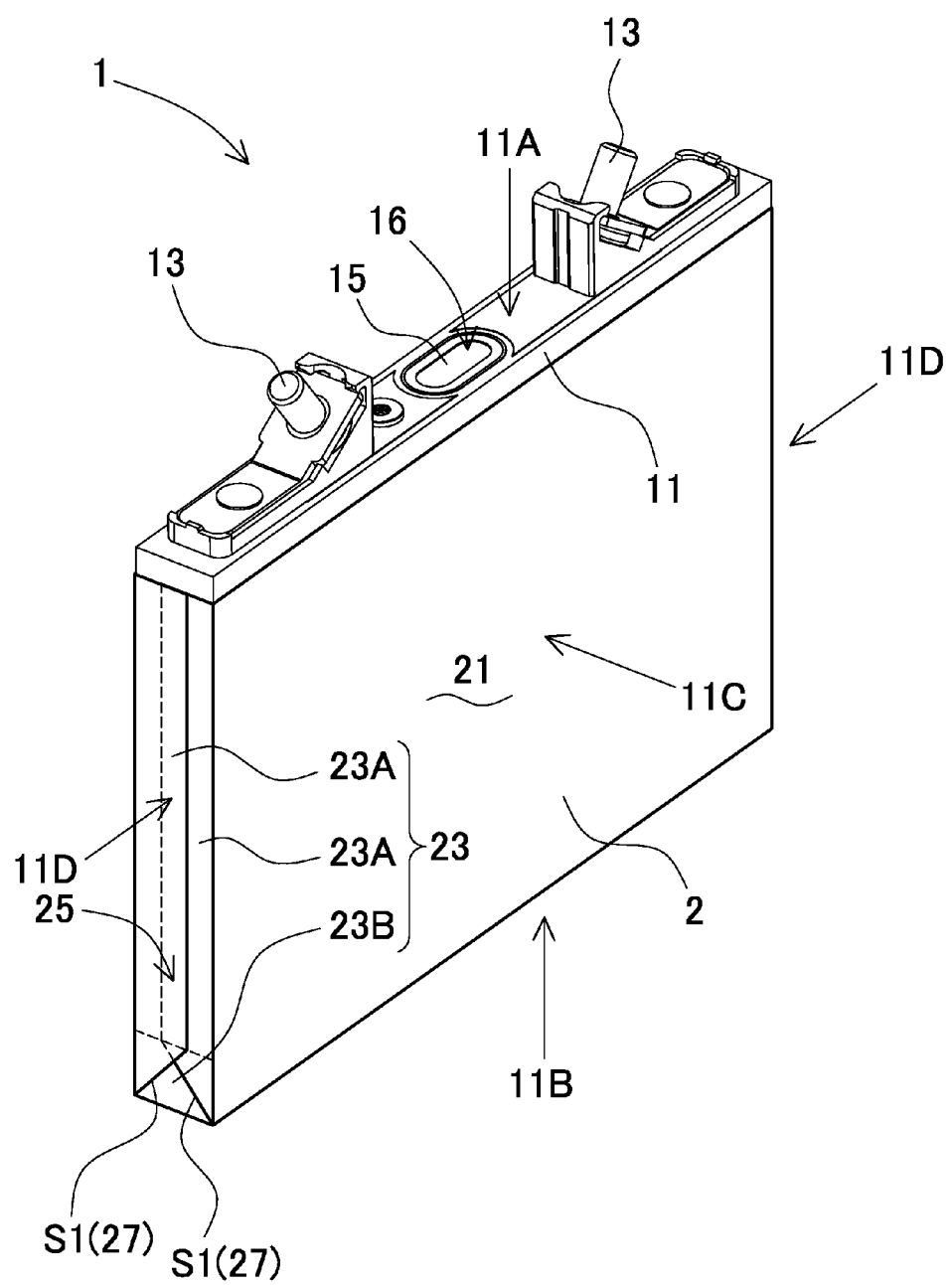
FIG. 5 is an enlarged perspective view of a rectangular battery cell.

In the rectangular battery cell 1 shown in FIGS. 5 and 8, both the folded parts 26, which are arranged on the both sides of the second side surface covering portion 23B, are folded inward at the fold lines S1, and then folded outward at the boundary lines L4. Accordingly, in this electrically insulating film 2, each of the folded parts 26 is sandwiched between the interior-side surface of the first side surface covering portion 23A and the exterior-side surface of the second side surface covering portion 23B so that the first and second side surface covering portions 23A and 23B entirely cover the side surfaces 11D of the exterior container 11.

Figure 9:
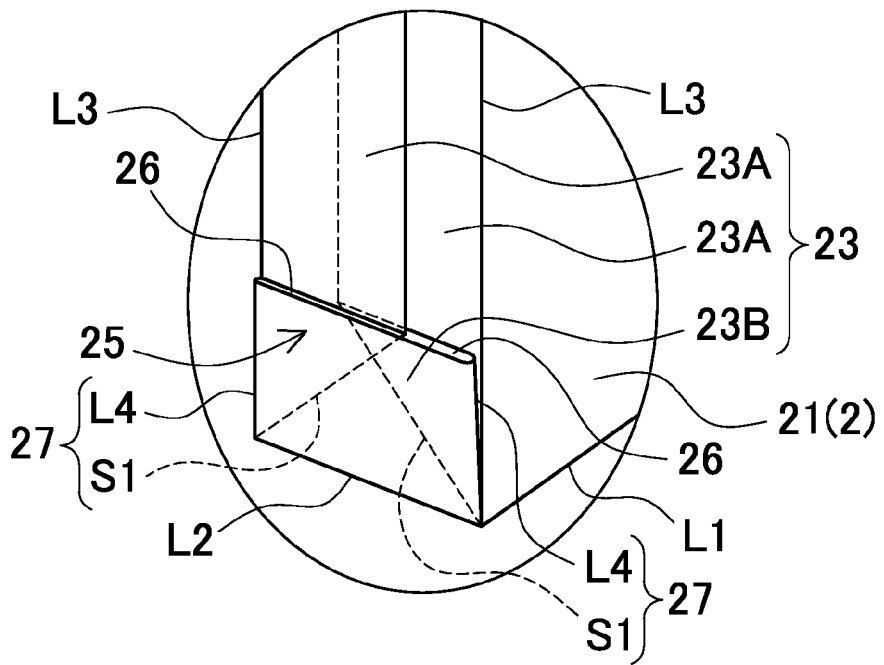
FIG. 9 is an exploded perspective view showing another exemplary structure of the electrically insulating film shown in FIG. 6 for covering the rectangular battery cell.

FIG. 9 shows another folded arrangement that both the folded parts 26, which are arranged on the both sides of the second side surface covering portion 23B, are folded outward at the fold lines S1, and then folded inward at the boundary lines L4. In this electrically insulating film 2, each of the folded parts 26 is sandwiched between the exterior-side surface of the first side surface covering portion 23A and the interior-side surface of the second side surface covering portion 23B so that the first and second side surface covering portions 23A and 23B entirely cover the side surfaces 11D of the exterior container 11.

Figure 10:
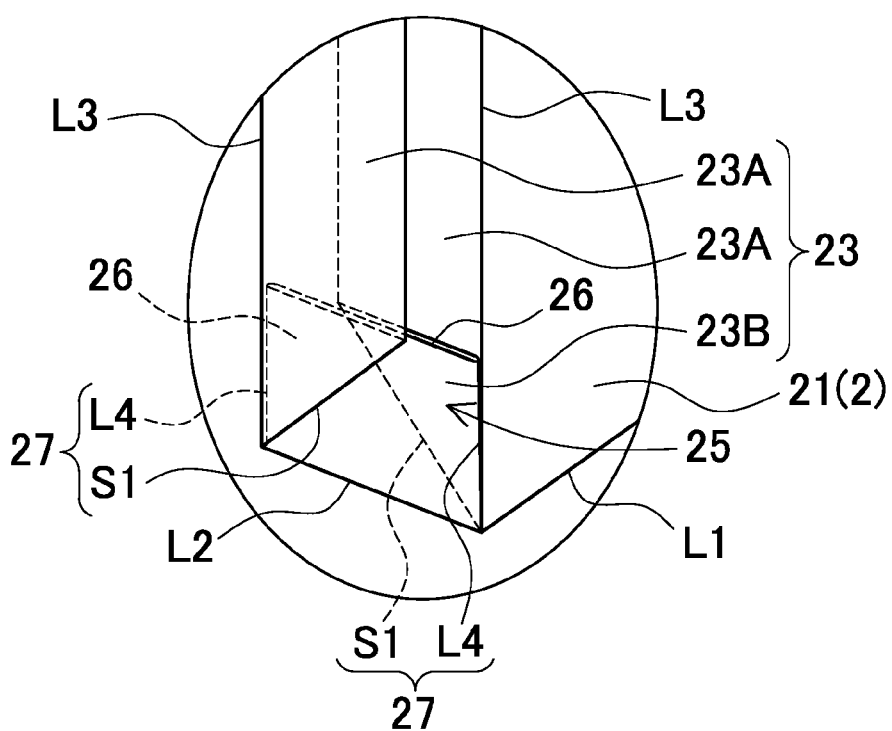
FIG. 10 is an exploded perspective view showing another exemplary structure of the electrically insulating film shown in FIG. 6 for covering the rectangular battery cell.

FIG. 10 shows another folded arrangement that one (right side in FIG. 10) of the folded parts 26, which are arranged on the both sides of the second side surface covering portion 23B, is folded outward at the fold line S1 and then folded inward at the boundary line L4 so that the one of folded part 26 is sandwiched between the exterior-side surface of the first side surface covering portion 23A and the interior-side surface of the second side surface covering portion 23B, while another folded part (left side in FIG. 10) is folded inward at the fold line S1 and then folded outward at the boundary line L4 so that the another folded part is sandwiched between the exterior-side surface of the second side surface covering portion 23B and the interior-side surface of the first side surface covering portion 23A.

As discussed above, the folded part 26 is preferably provided in the first side surface covering portion 23A so that the folded part 26 can be superposed on the exterior-side or interior-side surface of the first side surface covering portion 23A when being folded. The reason is that this folded arrangement allows all of the folding lines 27 to extend upward from the bottom surface 11B of the exterior container 11 as shown in FIGS. 5, 9 and 10, which in turn can more reliably prevent that water comes into the interior side from the exterior side of the electrically insulating film after the superposed part 25 is welded.

Figure 11:
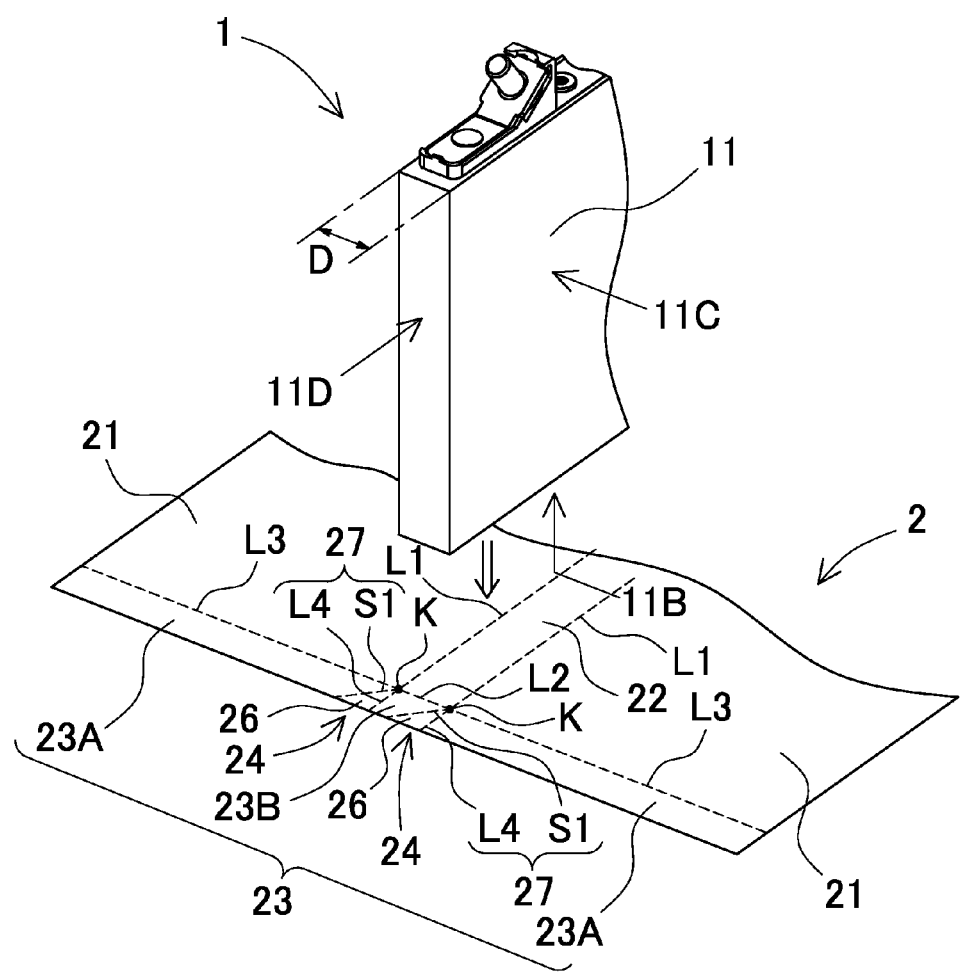
FIG. 11 is a perspective view showing the process for covering the rectangular battery cell with another exemplary electrically insulating film shown in FIG. 6.
Figure 12:
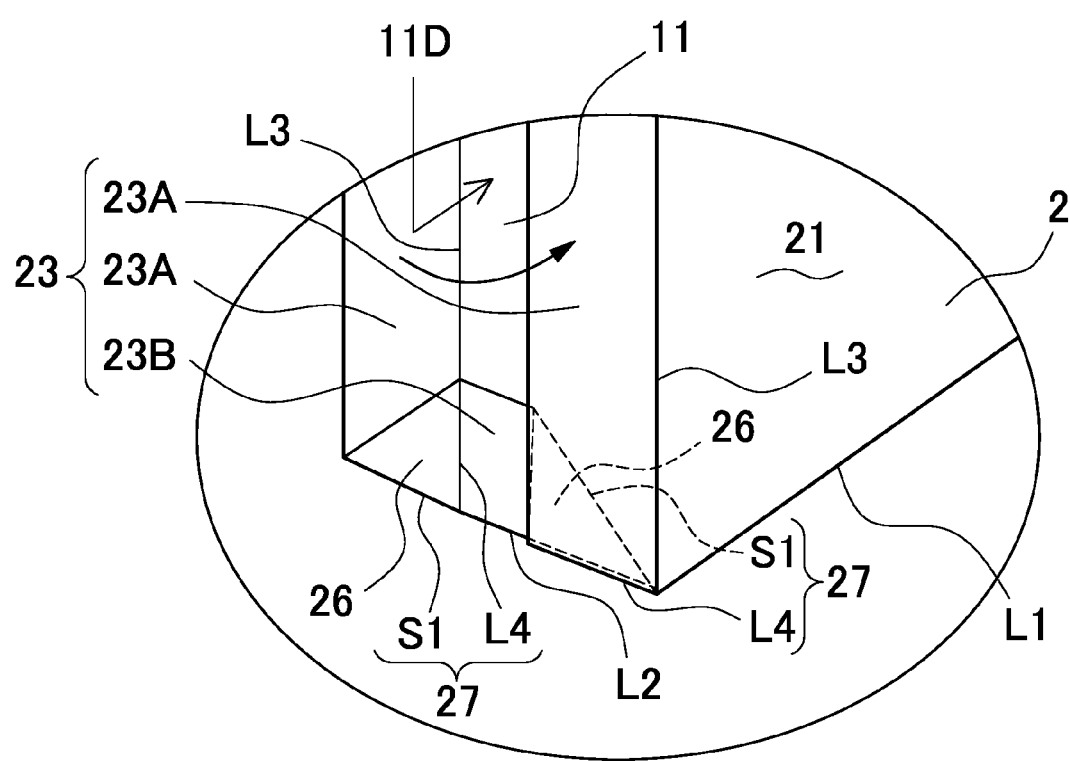
FIG. 12 is an enlarged perspective view showing the process for covering the rectangular battery cell with the electrically insulating film shown in FIG. 11.

However, the folded part 26 can be provided in the second side surface covering portion 23B so that the folded part 26 is superposed on the exterior-side or interior-side surface of the second side surface covering portion 23B when being folded as shown in FIGS. 11 and 12. The reason is that the folded part 26 can be welded onto the exterior-side or interior-side surface of the second side surface covering portion 23B so that it is possible to prevent that water comes into the interior side from the exterior side of the electrically insulating film. Although the electrically insulating film 2 shown in FIGS. 11 and 12 includes the folded parts 26 that are arranged in the connection areas 24 between the first side surface covering portions 23A and the second side surface covering portion 23B, one (right side in FIG. 11 or 12) of the folded parts 26 is arranged in the second side surface covering portion 23B, and sandwiched between the exterior-side surface of the second side surface covering portion 23B and the interior-side surface of the first side surface covering portion 23A, while another folded part (left side in FIG. 11 or 12) is arranged in the first side surface covering portion 23A, and sandwiched between the interior-side surface of the first side surface covering portion 23A and the exterior-side surfaces of the second side surface covering portion 23B.

Although it has been described that the aforementioned electrically insulating film 2 has the right-triangular folded part 26 that has the boundary line L4 between the first and second side surface covering portions 23A and 23B as the folding line 27 and is formed in the connection area 24 between the first and second side surface covering portions 23A and 23B, the electrically insulating film does not necessarily have the folded part that has the boundary line L4 between the first and second side surface covering portions as the folding line.

Figure 13:
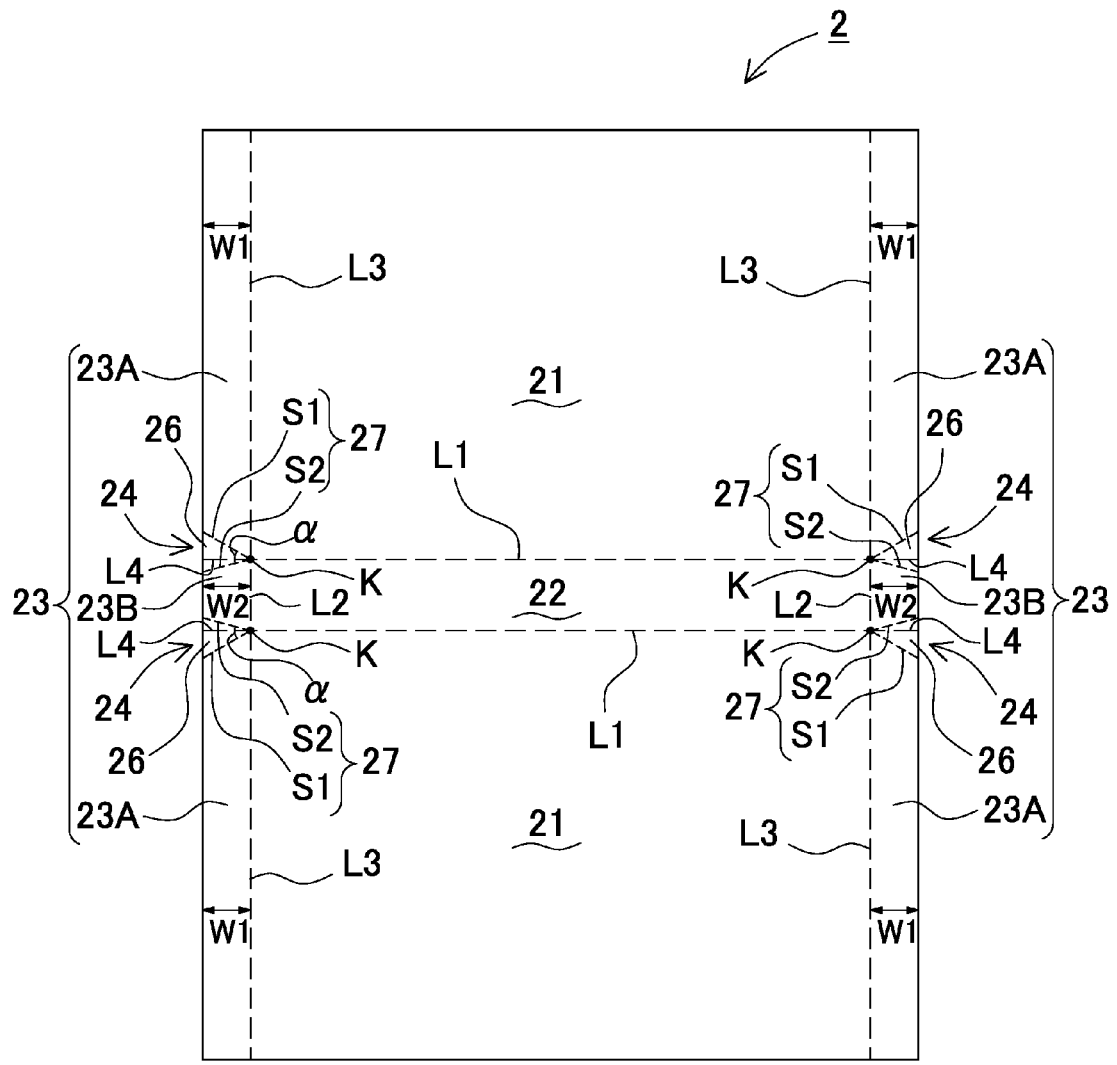
FIG. 13 is a developed view showing another exemplary electrically insulating film.
Figure 14:
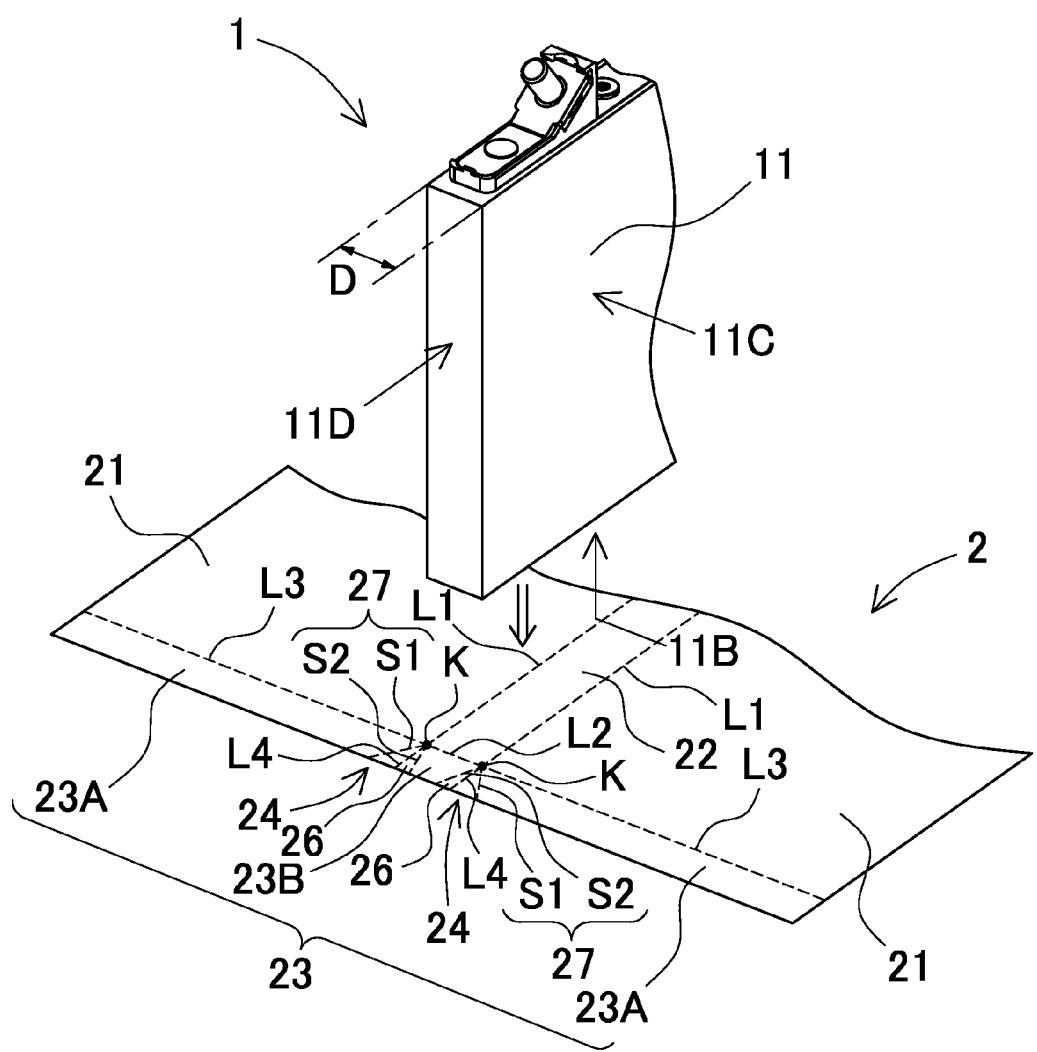
FIG. 14 is an exploded perspective view showing the process for covering the rectangular battery cell with the electrically insulating film shown in FIG. 13.

The electrically insulating film 2 shown in FIGS. 13 and 14 has triangular folded parts 26 each of which can be defined by fold lines S1 and S2. The fold lines S1 and S2 will be formed in the connection area 24 between the first and second side surface covering portions 23A and 23B, more specifically, in proximity to the boundary line L4 between the first and second side surface covering portions 23A and 23B. The fold lines S1 and S2 can serve as the folding lines 27. In the illustrated electrically insulating film 2, the fold line S1 extends in the first side surface covering portion 23A from the intersection K between the boundary lines L1 and L3, while the fold line S2 extends in the second side surface covering portion 23B from the intersection K so that the triangular folded part 26 is defined. In this electrically insulating film 2, the fold line S1 and the fold line S2 form an angle α of about 45 degrees. The folded part 26 is also folded inward at one of the fold lines S1 and S2, while the folded part 26 is folded outward at another fold line so that the folded part 26 will be superposed on the interior-side or exterior-side surface of the first side surface covering portion 23A. That is, the folded part 26 is folded so that the folded part 26 is sandwiched between the interior-side surface of the first side surface covering portion 23A and the exterior-side surface of the second side surface covering portion 23B, alternatively, the folded part 26 is folded so that the folded part 26 is sandwiched between the exterior-side surface of the first side surface covering portion 23A and the interior-side surface of the second side surface covering portion 23B. The folded part 26 will be welded to the first and second side surface covering portions 23A and 23B between which the folded part 26 is sandwiched. Thus, the folded part 26, the first and second side surface covering portions 23A and 23B can be made watertight.

Figure 15:
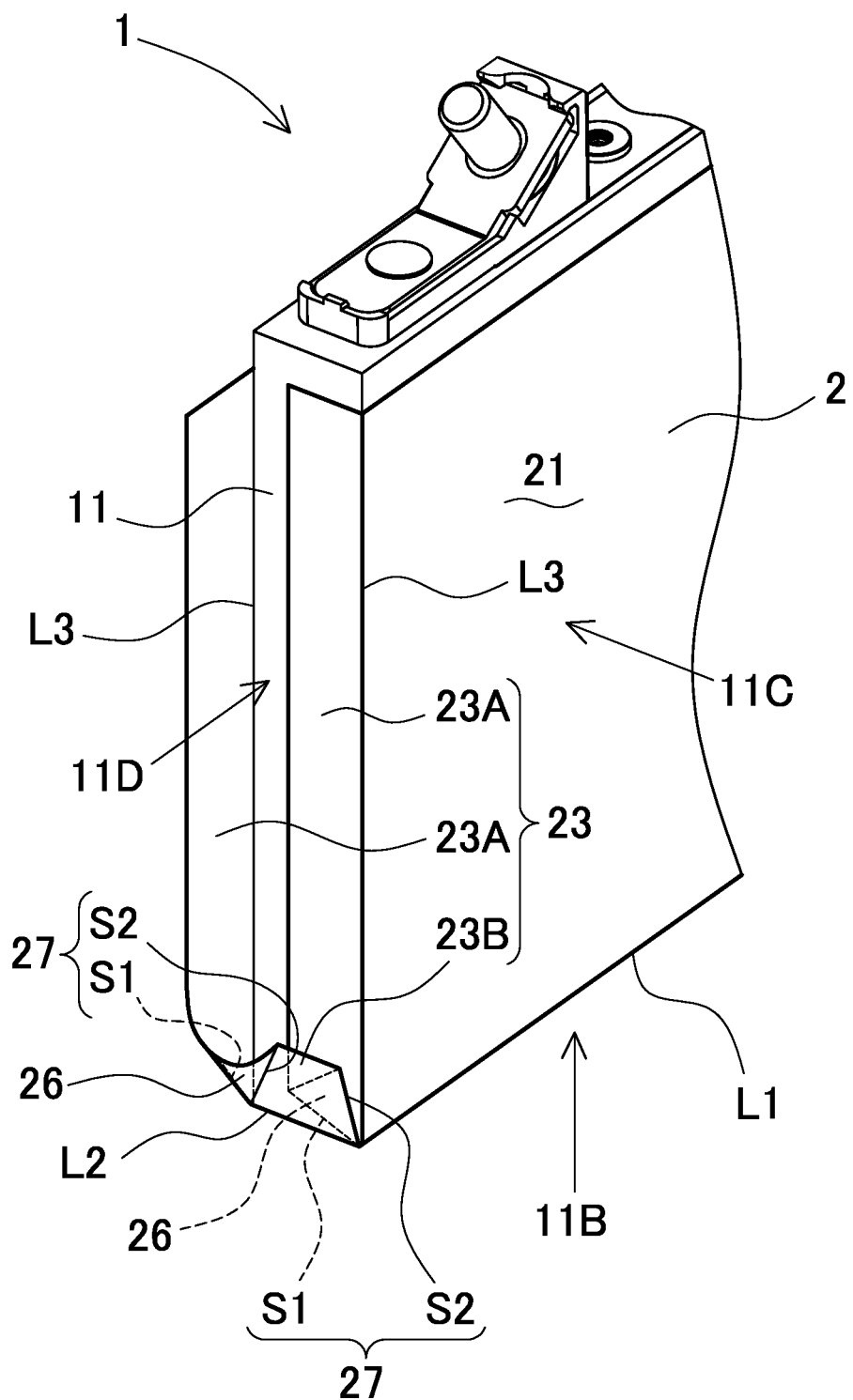
FIG. 15 is a perspective view showing the process for covering the rectangular battery cell with the electrically insulating film shown in FIG. 13.
Figure 16:
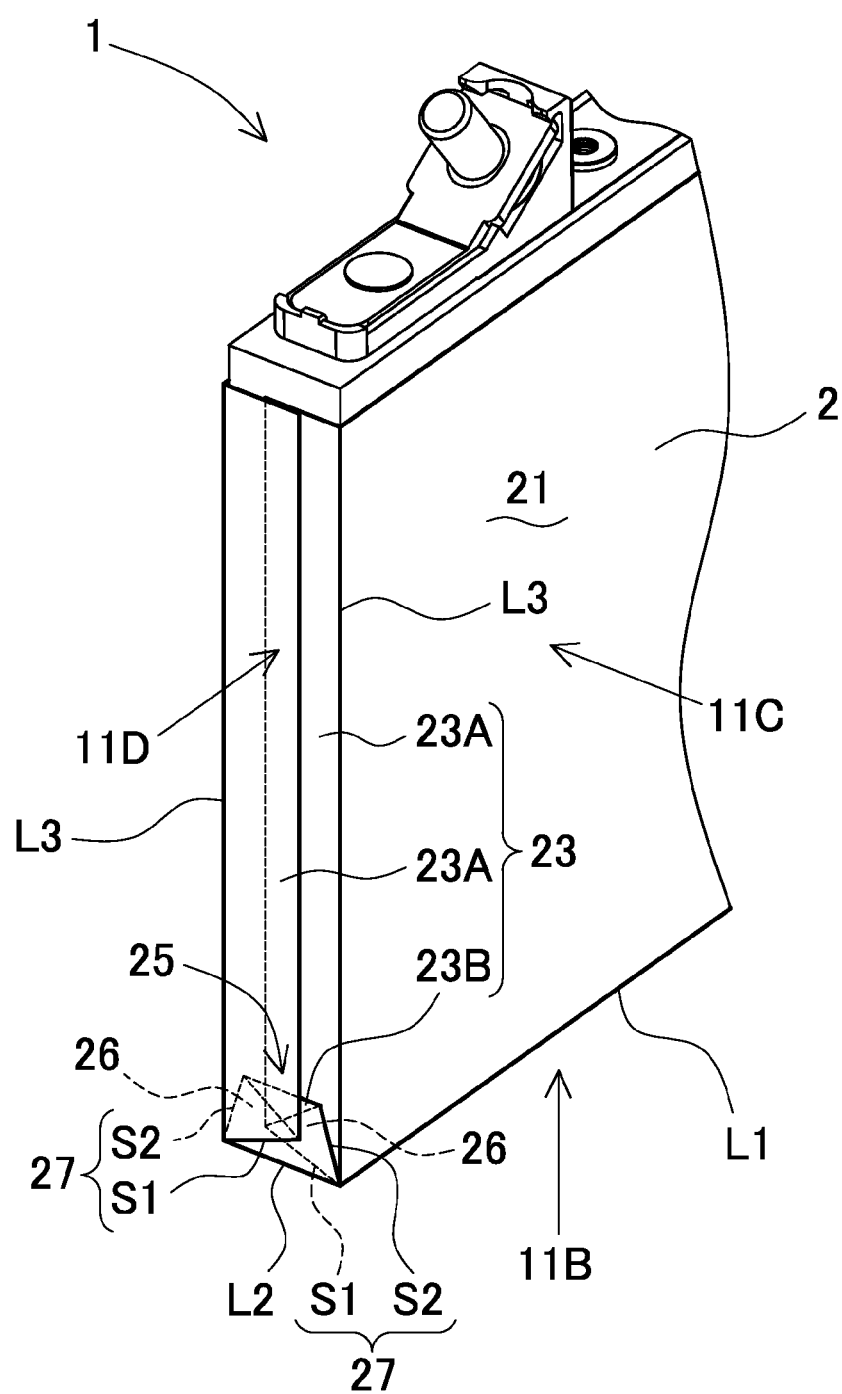
FIG. 16 is a perspective view showing the process for covering the rectangular battery cell with the electrically insulating film shown in FIG. 13.

FIGS. 15 and 16 show another folded arrangement that one (right side in FIG. 10) of the folded parts 26, which are arranged in the connection areas 24 arranged on the both sides of the second side surface covering portion 23B, is folded inward at the fold line S2 and outward at the fold line S1 so that the one of folded part 26 is sandwiched between the exterior-side surface of the first side surface covering portion 23A and the interior-side surface of the second side surface covering portion 23B after being folded, while another folded part (left side in FIG. 10) is folded outward at the fold line S2 and inward at the fold line S1 so that the another folded part is sandwiched between the interior-side surface of the first side surface covering portion 23A and the exterior-side surface of the second side surface covering portion 23B after being folded. According to the aforementioned rectangular battery cell 1, when the folded parts are folded in this folded arrangement, the folding lines 27 of the connection areas 24 can extend upward from the bottom surface 11B of the exterior container 11. As a result, it is possible to more reliably prevent that water comes into the interior side from the exterior side of the electrically insulating film after the superposed part 25 is welded. In the electrically insulating film, although not illustrated, both the folded parts in the connection areas, which are arranged on the both sides of the second side surface covering portion, can be folded so that both the folded parts can be sandwiched between the interior-side surface of the first side surface covering portion and the exterior-side surface of the second side surface covering portion. Alternatively, both the folded parts can be folded so that both the folded parts can be sandwiched between the exterior-side surface of the first side surface covering portion and the interior-side surface of the second side surface covering portion.

Also, in the electrically insulating film 2 shown in FIGS. 15 and 16, after the first and second side surface covering portions 23A and 23B are superposed on one another with the folded part 26 being sandwiched between the first and second side surface covering portions 23A and 23B, the first and second side surface covering portions 23A and 23B, the main surface covering portion 21, and the bottom surface covering portion 22 intersect perpendicularly to each other so that one corner part of the rectangular battery cell is covered by the first and second side surface covering portions 23A and 23B, the main surface covering portion 21, and the bottom surface covering portion 22. In particular, in this electrically insulating film 2, as shown in FIGS. 15 and 16, when the first and second side surface covering portions 23A and 23B are superposed on one another on the side surface 11D of the exterior container 11, the folding lines 27 of the triangular folded part 26, which is sandwiched between the first and second side surface covering portions 23A and 23B, can be disconnected from the boundary lines L2 and L3. As a result, it is possible to reduce overlap parts of the first and second side surface covering portions 23A and 23B, which are superposed on one another on the side surface 11D of the exterior container 11, in proximity to the boundary lines L3 and L2 between the first side surface covering portions 23A and the second side surface covering portion 23B, and the main surface covering portions 21 and the bottom surface covering portion 22, in other words, parts of the electrically insulating film can be thin in proximity to the boundary lines L2 and L3. Therefore, the superposed part 25 can be reliably welded.

The electrically insulating film 2 shown in FIG. 13 can cover the surfaces of the exterior container 11 in the following processes as shown in FIGS. 14 to 16.

(1) As shown in FIG. 14, the bottom surface covering portion 22 of the electrically insulating film 2 faces the bottom surface 11B of the exterior container 11. Subsequently, the main surface covering portions 21 and the bottom surface covering portion 22 are folded inward at the boundary lines L1 between the main surface covering portions 21 and the bottom surface covering portion 22. Thus, the bottom surface 11B of the exterior container 11 is covered with the bottom surface covering portion 22, while the main surfaces 11C of the exterior container 11 are covered with the main surface covering portions 21.

(2) As shown in FIG. 15, one (right side in FIG. 15) of the first side surface covering portions 23A is folded inward at the boundary line L3 between the first side surface covering portions 23A and the main surface covering portion 21 so that the side surface of the exterior container 11 is covered with the one of the first side surface covering portions 23A.

(3) The second side surface covering portion 23B is folded inward at the boundary line L2 between the second side surface covering portion 23B and the bottom surface covering portion 22. Thus, the bottom part of the side surface 11D of the exterior container 11 is covered with the second side surface covering portion 23B. In this process, in one (right side in FIG. 15) of the connection areas 24, the folded part 26 is folded outward at the fold line S1, which is one edge of the folded part 26, and is folded inward at the fold line S2, which is other one edge of the folded part 26, so that the folded part 26 is sandwiched between the exterior-side surface of the first side surface covering portion 23A and the interior-side surface of the second side surface covering portion 23B.

(4) As shown in FIG. 16, another (left side in FIG. 16) of the first side surface covering portions 23A is folded inward at the boundary line L3 between the first side surface covering portions 23A and the main surface covering portion 21 so that the side surface of the exterior container 11 is covered with the one of the first side surface covering portions 23A. In this process, in another (left side in FIG. 16) of the connection areas 24, the folded part 26 is folded inward at the fold line S1, which is one edge of the folded part 26, and is folded outward at the fold line S2, which is other one edge of the folded part 26, so that the folded part 26 is sandwiched between the exterior-side surface of the second side surface covering portion 23B and the interior-side surface of the first side surface covering portion 23A.

(5) After the first and second side surface covering portions 23A and 23B are folded on the side surfaces 11D of the exterior container 11 so that the first and second side surface covering portions are superposed on one another, the superposed parts 25 are welded and made watertight. Thus, the first and second side surface covering portions 23A and 23B cover the side surfaces 11D of the exterior container 11.

For example, a welding plate of a heater (not shown) is pressed onto the superposed part 25 of the first and second side surface covering portions 23A and 23B so that the superposed part 25 can be welded.

In the electrically insulating films shown in FIGS. 6 to 16, the protruding width (W1) of the first side surface covering portion 23A is dimensioned equal to the protruding width (W2) of the second side surface covering portion 23B so that the side edge of the first side surface covering portion 23A and the side edge of the second side surface covering portion 23B form a single straight line. In addition, the aforementioned electrically insulating films 2, the protruding width (W1) of the first side surface covering portion 23A and the protruding width (W2) of the second side surface covering portion 23B are dimensioned larger than one half the width (D) of the side surface 11D of the exterior container 11, and smaller than the width (D) of the side surface 11D of the exterior container 11. According to this construction, the first and second side surface covering portions 23A and 23B can be surely superposed on one another on the side surface 11D of the exterior container 11 so that the side surface 11D can be covered without gaps with the first and second side surface covering portions 23A and 23B. According to the thus-constructed electrically insulating films, since the entire exterior shape of the electrically insulating films is a rectangle, which is very simple, it is possible to minimize waste and effectively use the electrically insulating film when the rectangular battery cell is watertightly covered with the electrically insulating film.

Figure 17:
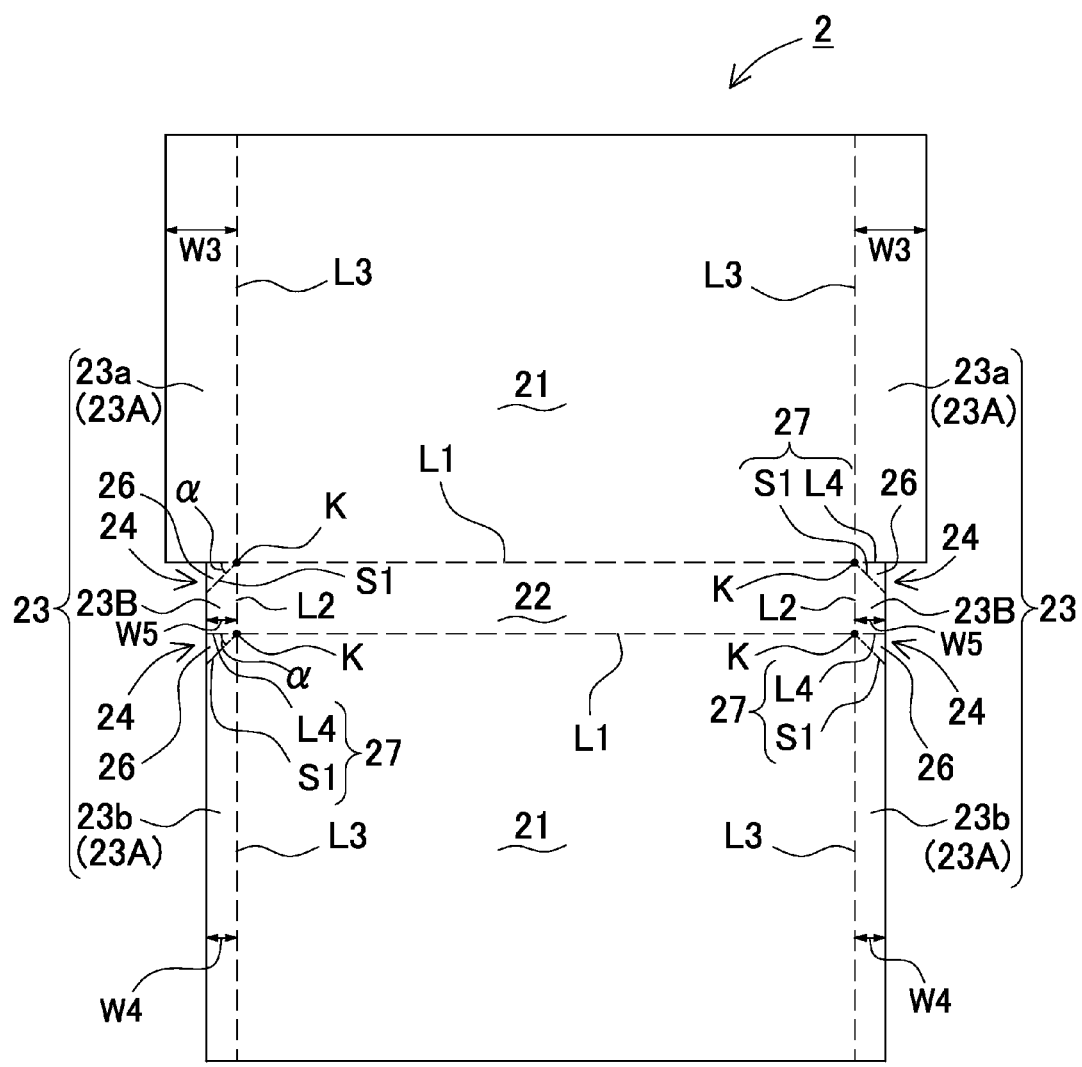
FIG. 17 is a developed view showing another exemplary electrically insulating film.

In the electrically insulating film 2 shown in a developed view of FIG. 17, in order that the first side surface covering portion 23A can cover substantially the whole surface of the side surface 11D of the exterior container 11, the first side surface covering portion 23A includes wide and narrow side surface covering portions 23a and 23b. The wide side surface covering portions 23a have a wide protruding width protruding from the main surface covering portion 21. The narrow side surface covering portions 23b have a narrow protruding width protruding from the main surface covering portion 21. In this electrically insulating film 2, the protruding width (W3) of the wide side surface covering portion 23a is dimensioned substantially equal to the width (D) of the side surface 11D of the exterior container 11 so that the wide side surface covering portion 23a can cover substantially the whole surface of the side surface 11D of the exterior container 11. The protruding width (W4) of the narrow side surface covering portion 23b is dimensioned equal to the protruding width (W5) of the second side surface covering portion 23B protruding from the bottom surface covering portion 22. The connection area 24 can be formed in the boundary part between the narrow side surface covering portion 23b and the second side surface covering portion 23B. The narrow side surface covering portion 23b and the second side surface covering portion 23B, which have the same protruding width, are continuously arranged in the connection area 24. In the illustrated electrically insulating film, since the protruding width (W5) of the second side surface covering portion 23B is dimensioned equal to the protruding width (W4) of the narrow side surface covering portion 23b, it is possible to minimize waste and effectively use the electrically insulating film when the rectangular battery cell is watertightly covered with the electrically insulating film. However, in the electrically insulating film, the protruding width (W5) of the second side surface covering portion can be dimensioned equal to the protruding width (W3) of the wide side surface covering portion. According to this electrically insulating film, since the superposed part can be wide, it is possible to improve the watertight reliability.

The electrically insulating film 2 shown in FIG. 17 also has the triangular folded parts 26 that are arranged in the connection areas 24 between the first side surface covering portions 23A and the second side surface covering portion 23B. The folded part 26 can be folded at the folding lines 27, which are two edges of the folded part 26, so that the first and second side surface covering portions 23A and 23B are superposed on one another on the side surface 11D of the exterior container 11. In the electrically insulating film 2 shown in FIGS. 17 and 18, the right-triangular folded part 26 can be formed in the connection area 24, which is located in the narrow side surface covering portion 23b, between the narrow side surface covering portion 23b and the second side surface covering portion 23B, while the right-triangular folded part 26 can be formed in the connection area 24, which is located in second side surface covering portion 23B, between the wide side surface covering portion 23a and the second side surface covering portion 23B. The folded part 26 is folded inward at one of the folding lines 27, which are the boundary line L4 and the fold line S1, while the folded part 26 is folded outward at another folding line so that the folded part 26 will be superposed on the exterior-side or interior-side surface of the first side surface covering portion 23A.

Figure 18:
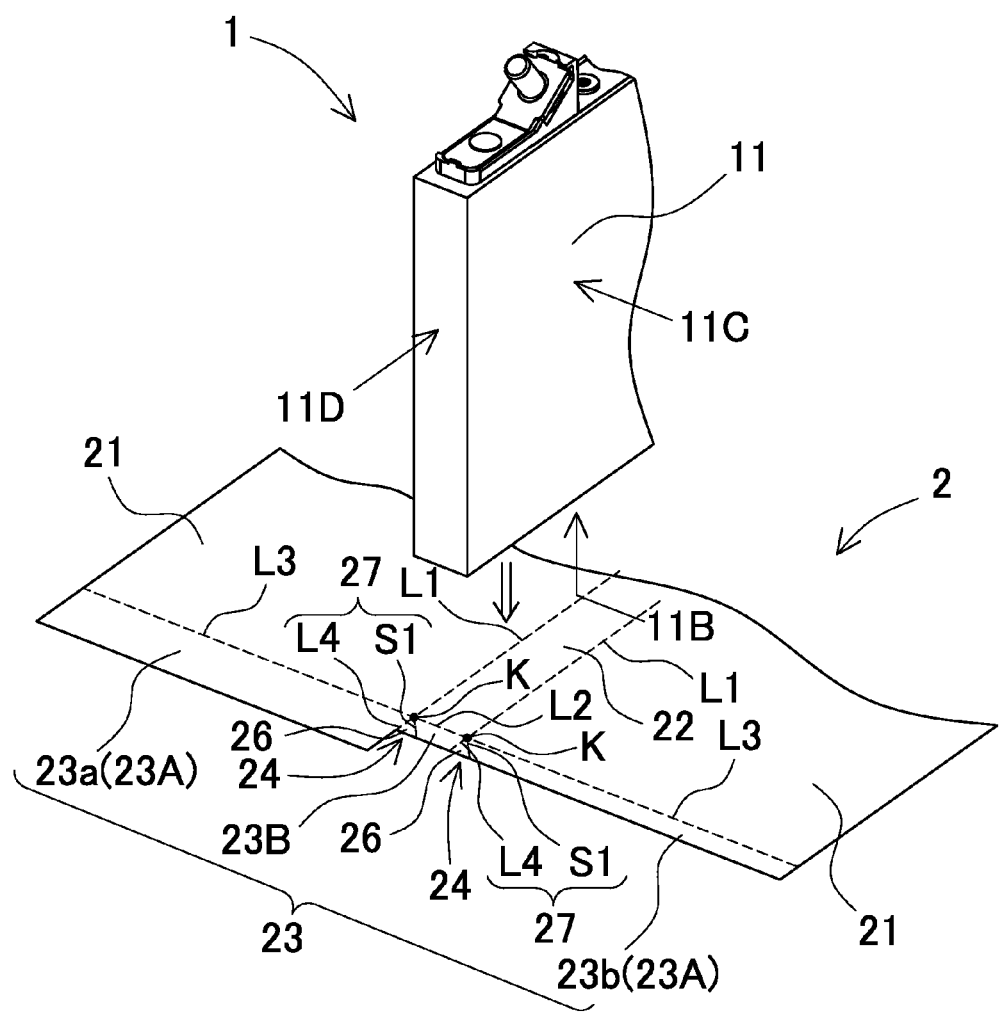
FIG. 18 is an exploded perspective view showing the process for covering the rectangular battery cell with the electrically insulating film shown in FIG. 17.
Figure 19:
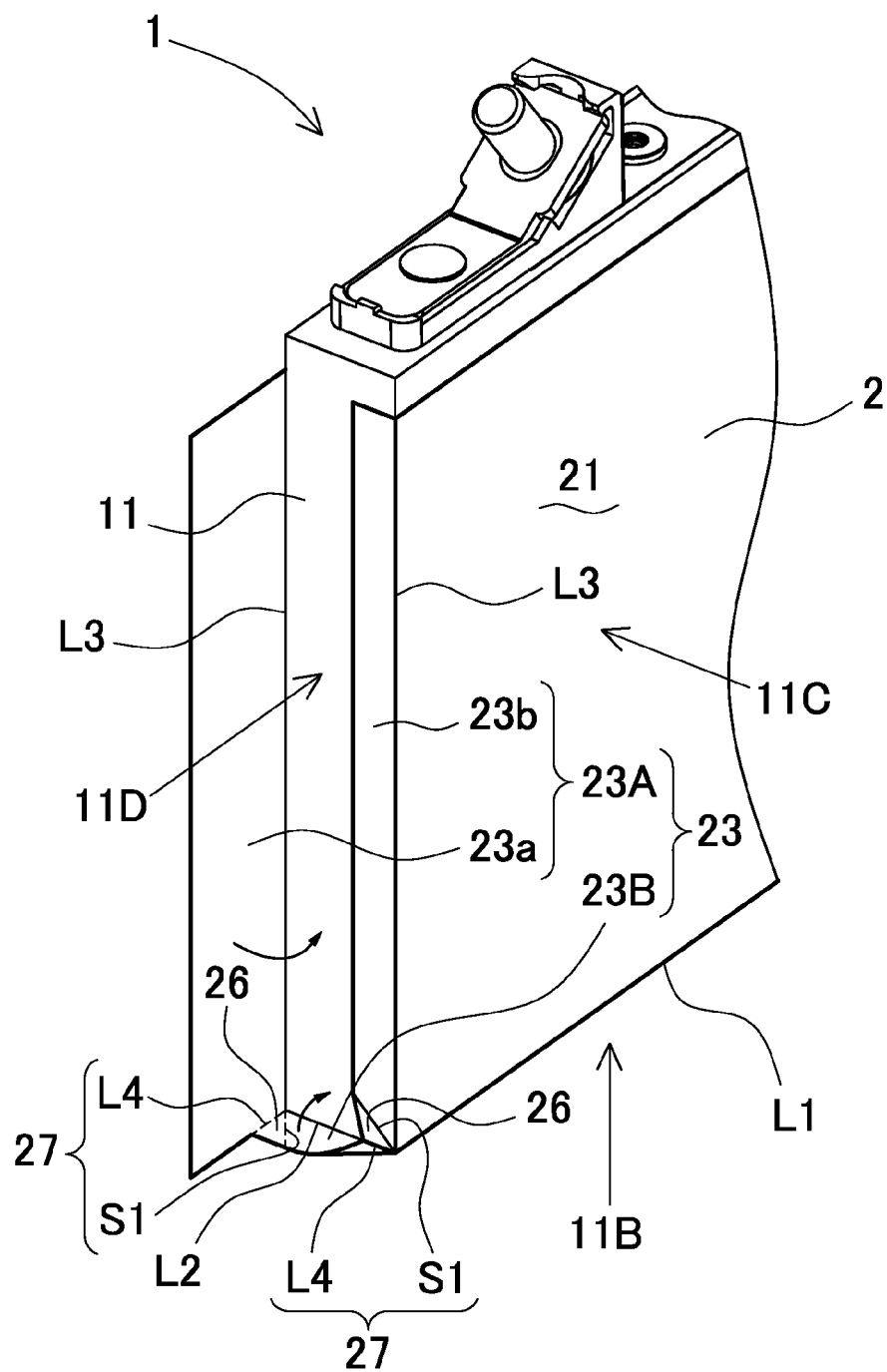
FIG. 19 is a perspective view showing the process for covering the rectangular battery cell with the electrically insulating film shown in FIG. 17.
Figure 20:
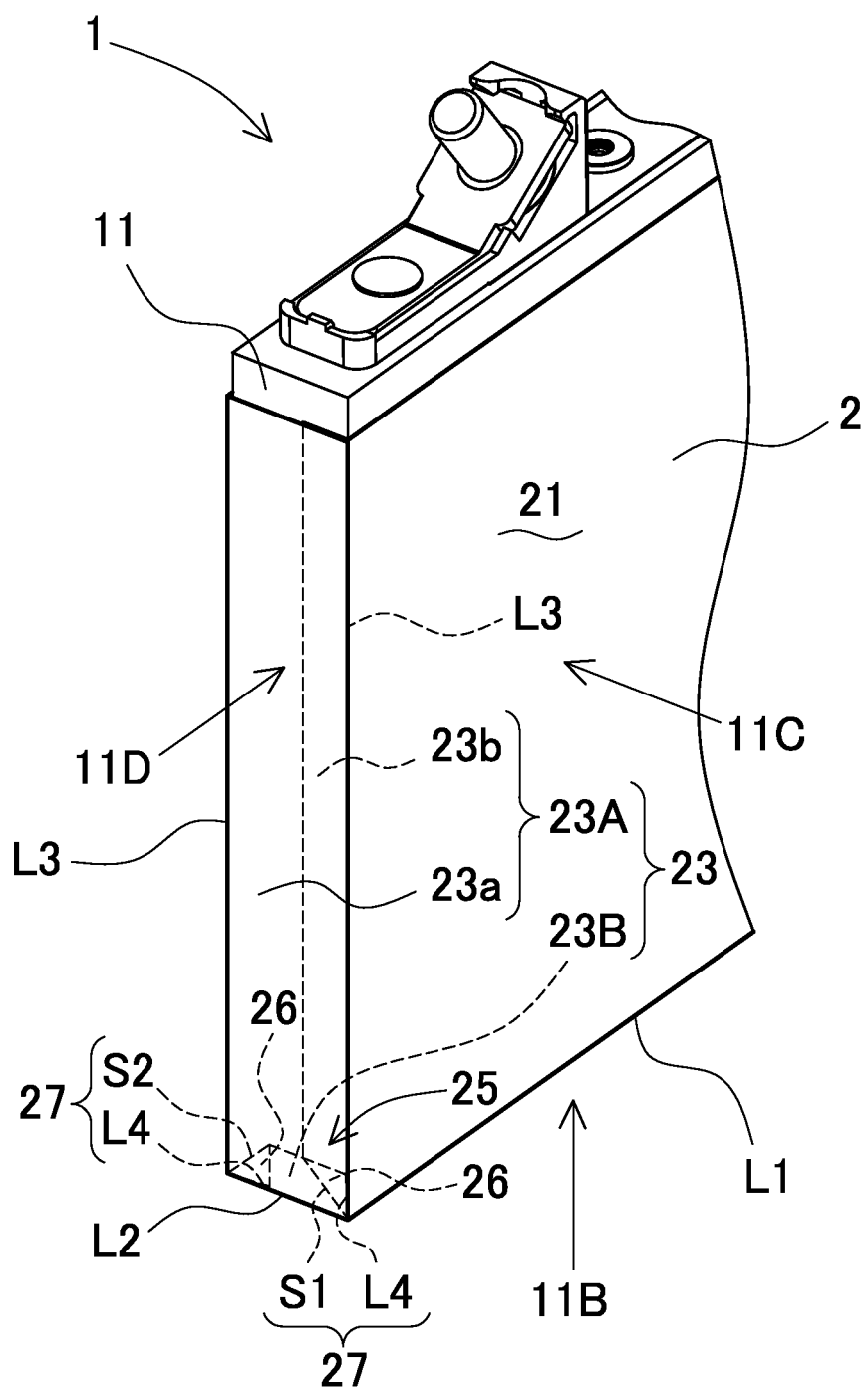
FIG. 20 is a perspective view showing the process for covering the rectangular battery cell with the electrically insulating film shown in FIG. 17.

The electrically insulating film 2 shown in FIG. 17 can cover the surfaces of the exterior container 11 in the following processes as shown in FIGS. 18 to 20.

(1) As shown in FIG. 18, the bottom surface covering portion 22 of the electrically insulating film 2 faces the bottom surface 11B of the exterior container 11. Subsequently, the main surface covering portions 21 and the bottom surface covering portion 22 are folded inward at the boundary lines L1 between the main surface covering portions 21 and the bottom surface covering portion 22. Thus, the bottom surface 11B of the exterior container 11 is covered with the bottom surface covering portion 22, while the main surfaces 11C of the exterior container 11 are covered with the main surface covering portions 21.

(2) As shown in FIG. 19, the narrow side surface covering portion 23b is folded inward at the boundary line L3 between the narrow side surface covering portion 23b and the main surface covering portion 21 so that the side edge part of the side surface 11D of the exterior container 11 is covered with the narrow side surface covering portion 23b.

(3) The second side surface covering portion 23B is folded inward at the boundary line L2 between the second side surface covering portion 23B and the bottom surface covering portion 22. Thus, the bottom part of the side surface 11D of the exterior container 11 is covered with the second side surface covering portion 23B. In this process, in the connection areas 24 between the second side surface covering portion 23B and the narrow side surface covering portion 23b, the folded part 26 is folded inward at the fold line S1, which is one edge of the folded part 26, and is folded outward at the boundary line L4, which is other one edge of the folded part 26, so that the folded part 26 is sandwiched between the exterior-side surface of the first side surface covering portion 23A and the interior-side surface of the second side surface covering portion 23B.

(4) As shown in FIG. 20, the wide side surface covering portion 23a is folded inward at the boundary line L3 between the wide side surface covering portion 23a and the main surface covering portion 21 so that the side surface 11D of the exterior container 11 is covered with the wide side surface covering portion 23a. In this process, in the connection areas 24 between the second side surface covering portion 23B and the wide side surface covering portion 23a, the folded part 26 is folded outward at the fold line S1, which is one edge of the folded part 26, and is folded inward at the boundary line L4, which is other one edge of the folded part 26, so that the folded part 26 is sandwiched between the exterior-side surface of the second side surface covering portion 23B and the interior-side surface of the first side surface covering portion 23A.

(5) After the narrow side surface covering portion 23b, the second side surface covering portion 23B and the wide side surface covering portion 23a are folded on the side surfaces 11D of the exterior container 11 so that the narrow side surface covering portion 23b, the second side surface covering portion 23B and the wide side surface covering portion 23a are superposed on one another, the superposed parts 25 are welded and made watertight. Thus, the narrow side surface covering portion 23b, the second side surface covering portion 23B, and the wide side surface covering portion 23a cover the side surfaces 11D of the exterior container 11.

For example, a welding plate of a heater (not shown) is pressed onto the superposed part 25 of the narrow side surface covering portion 23b, the second side surface covering portion 23B, and the wide side surface covering portion 23a so that the superposed part 25 can be welded.

In the rectangular battery cell 1 shown in FIG. 20, when the narrow side surface covering portion 23b, the second side surface covering portion 23B, and the wide side surface covering portion 23a are superposed on one another on the side surface 11D of the exterior container 11, the wide side surface covering portion 23a is arranged on the outermost side. According to this rectangular battery cell 1, since substantially the whole exterior-side surface side of the side surface 11D of the exterior container 11 is covered with the wide side surface covering portion 23a that has the protruding width (W3) substantially equal to the width (D) of the side surface 11D of the exterior container 11, the side surface 11D can have a simple and quality appearance in the covered part. However, the wide side surface covering portion of the electrically insulating film is not necessarily superposed on the outermost side. The narrow side surface covering portion and the second side surface covering portion may be superposed on the exterior-side surface of the wide side surface covering portion.

In the electrically insulating films 2 shown in FIGS. 6 to 20, the first side surface covering portion 23A covers substantially the whole side surface 11D of the exterior container 11. According to the aforementioned electrically insulating films 2, although the second side surface covering portion 23B does not protrude long from the bottom surface covering portion 22, the side surface 11D of the exterior container 11 can be covered with the second side surface covering portion 23B, which is narrow in other words has a small protruding width, and the first side surface covering portion 23A.

Figure 21:
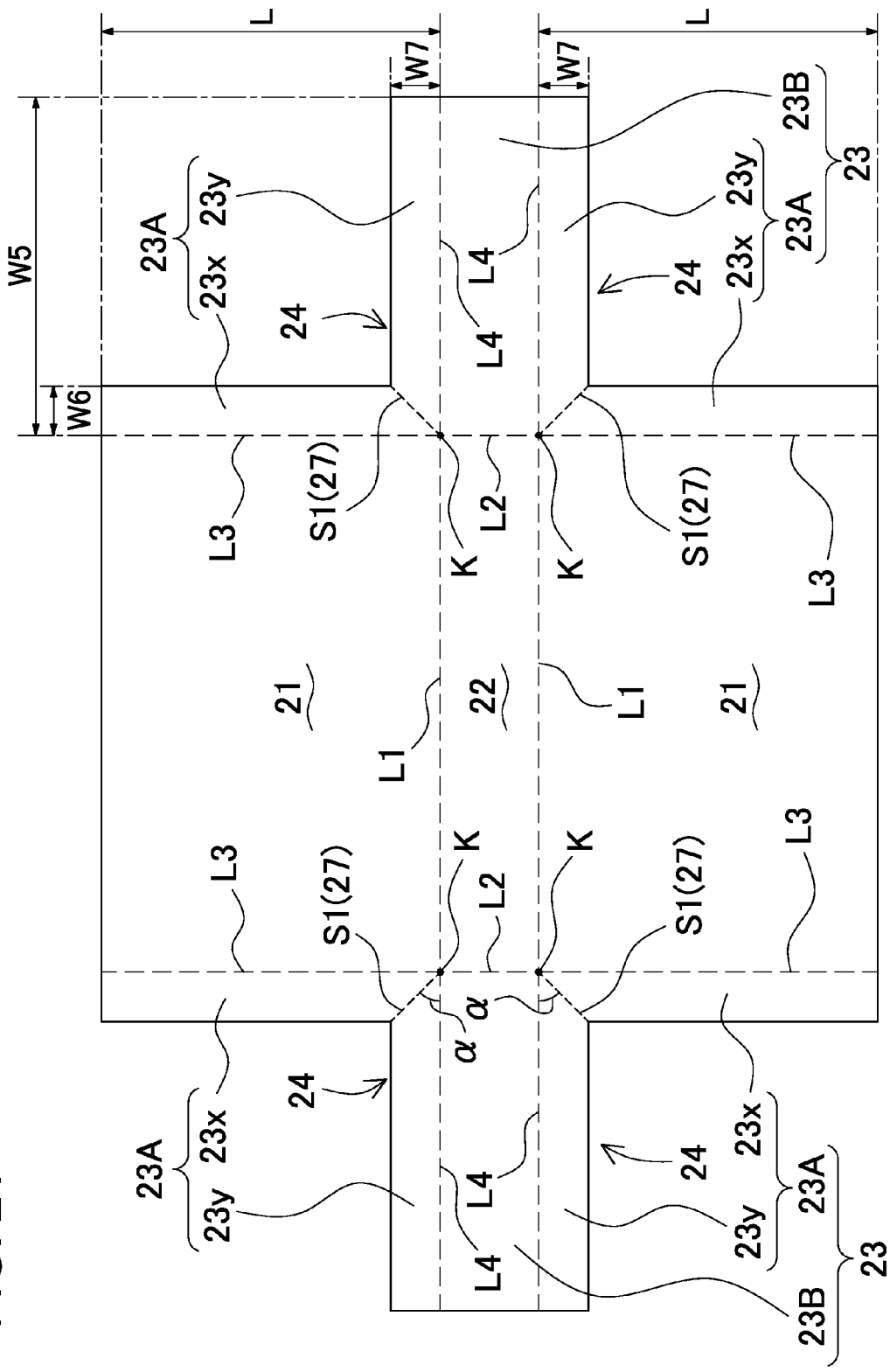
FIG. 21 is a developed view showing another exemplary electrically insulating film.
Figure 22:
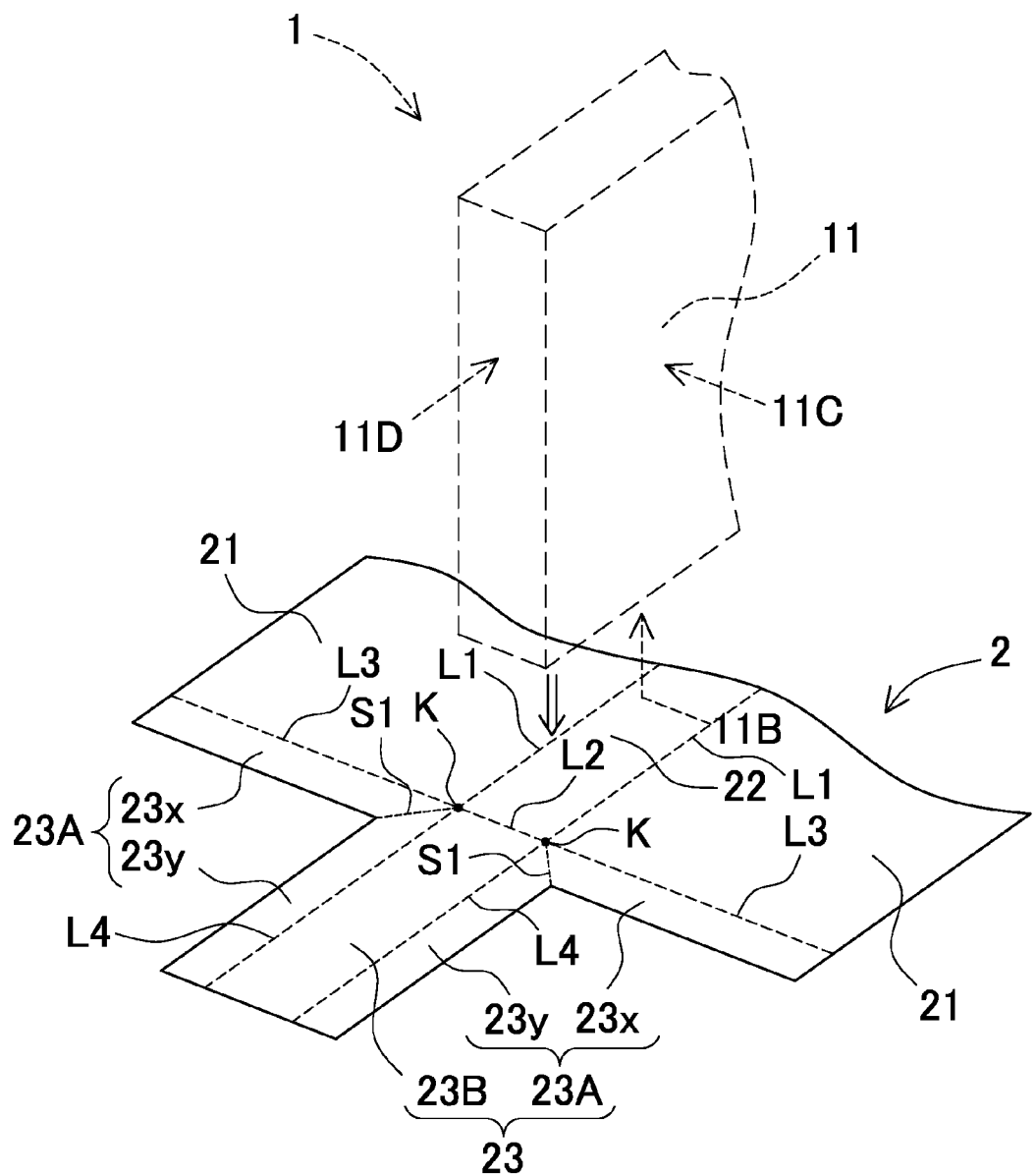
FIG. 22 is an exploded perspective view showing the process for covering the rectangular battery cell with the electrically insulating film shown in FIG. 21.
Figure 23:
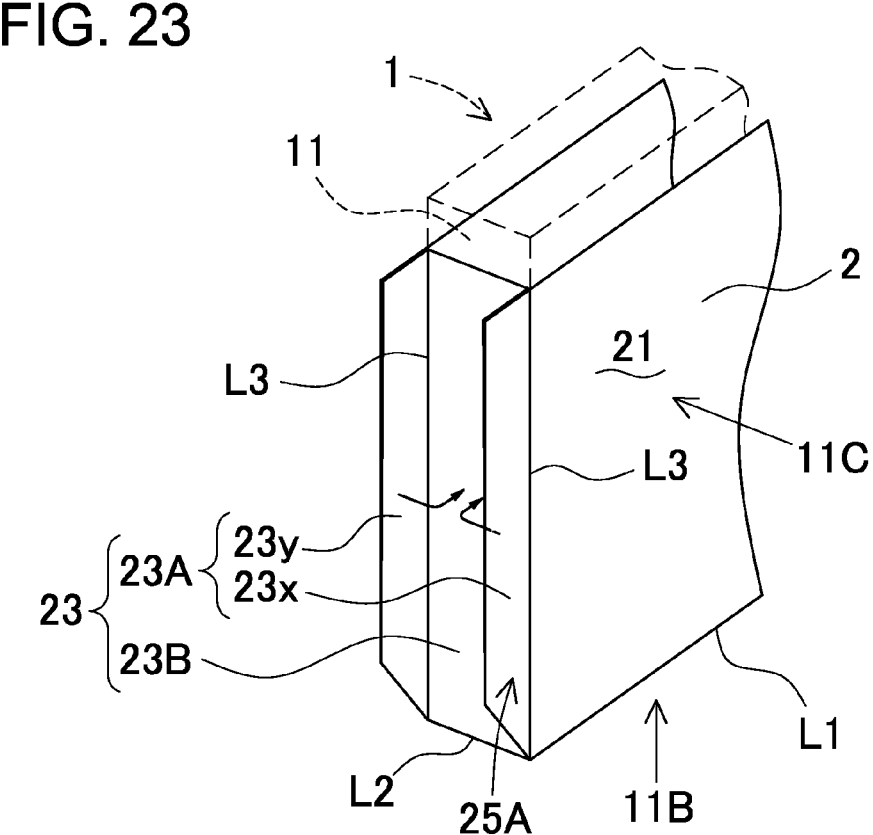
FIG. 23 is a perspective view showing the process for covering the rectangular battery cell with the electrically insulating film shown in FIG. 21.
Figure 24:
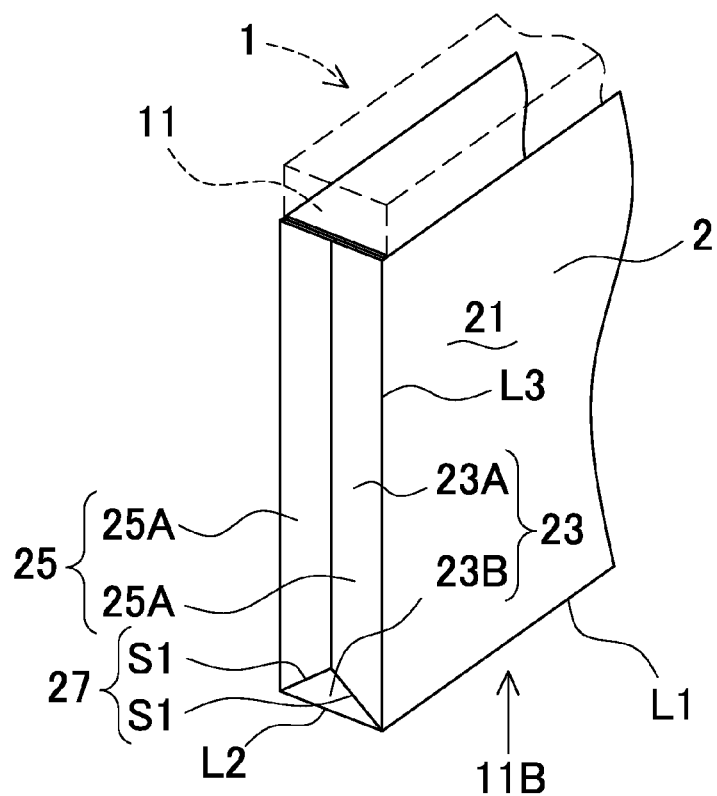
FIG. 24 is a perspective view showing the process for covering the rectangular battery cell with the electrically insulating film shown in FIG. 21.

In the electrically insulating film 2 shown in a developed view of FIG. 21, the second side surface covering portion 23B covers substantially the whole side surface 11D of the exterior container 11. In the electrically insulating films 2 shown in FIG. 21, in order that the second side surface covering portion 23B can cover substantially the whole side surface 11D of the exterior container 11, the protruding width (W5) of the second side surface covering portion 23B is dimensioned equal to the length (L) of the first side surface covering portion 23A. As shown in FIGS. 22 to 24, the bottom and main surface covering portions 22 and 21 of the electrically insulating film 2 are folded inward at the boundary lines L1 between the bottom and main surface covering portions 22 and 21 so that the bottom and main surface covering portions 22 and 21 cover the bottom and main surfaces 11B and 11C of the exterior container 11, respectively. In addition, the second side surface covering portion 23B is folded inward at the boundary line L2 between the second side surface covering portion 23B and the bottom surface covering portion 22 so that the side surface 11D of the exterior container 11 is covered with the second side surface covering portion 23B. In this illustrated electrically insulating film 2, in order to cover substantially the whole surfaces of the main surfaces 11C and the side surfaces 11D of the exterior container 11, the protruding width (W5) of the second side surface covering portion 23B is dimensioned substantially equal to the height of the side surface 11D of the exterior container 11.

In addition, in this electrically insulating film 2, the first side surface covering portion 23A can include a main-surface-side covering portion 23x, and a side-surface-side covering portion 23y. The main-surface-side covering portion 23x protrudes from the side edge of the main surface covering portion 21. The side-surface-side covering portion 23y protrudes from the boundary edge of the second side surface covering portion 23B in the connection area 24 between the first and second side surface covering portions 23A and 23B. In this electrically insulating film 2, after the bottom surface 11B, the main surfaces 11C, and the side surfaces 11D of the exterior container 11 are covered with the bottom surface covering portion 22, the main surface covering portions 21, and the second side surface covering portions 23B, respectively, the main-surface-side and side-surface-side covering portions 23x and 23y, which protrude from the edges of the main and second surface covering portions 21 and 23B, respectively, are superposed on one another. Thus, water can be prevented from comings into the interior side from the exterior side of the electrically insulating film by welding the superposed parts 25A. In the electrically insulating film 2 shown in FIG. 21, the protruding width (W6) of the main-surface-side covering portion 23x is dimensioned equal to the protruding width (W7) of the side-surface-side covering portion 23y. The main-surface-side and side-surface-side covering portions 23x and 23y are folded at the fold line S1 in the boundary part between them, and are superposed on one another. In addition, the protruding widths (W6, W7) of the main-surface-side and side-surface-side covering portions 23x and 23y of the first side surface covering portion 23A are dimensioned smaller than the width (D) of the side surface 11D of the exterior container 11. The protruding widths (W6, W7) of the main-surface-side and side-surface-side covering portions 23x and 23y can be one half the width (D), or smaller one half than the width (D) of the side surface 11D of the exterior container 11. According to the thus-constructed electrically insulating film 2, the maximum number of layers of the superposed part 25 can be three after the electrically insulating film is folded so that parts of the electrically insulating film are superposed one another. As a result, the superposed part 25 can be more stably welded and made watertight. In the aforementioned electrically insulating film 2, the main-surface-side and side-surface-side covering portions 23x and 23y that are superposed on one another are folded on the exterior-side surface of the second side surface covering portion 23B that covers the side surface 11D of the exterior container 11 so that the first and second side surface covering portions 23A and 23B can be superposed on one another. The superposed part 25 of the first and second side surface covering portions 23A and 23B is welded and made watertight.

The electrically insulating film 2 shown in FIG. 21 can cover the surfaces of the exterior container 11 in the following processes as shown in FIGS. 22 to 24.

(1) As shown in FIG. 22, the bottom surface covering portion 22 of the electrically insulating film faces the bottom surface 11B of the exterior container 11. Subsequently, the main surface covering portions 21 and the bottom surface covering portion 22 are folded inward at the boundary lines L1 between the main surface covering portions 21 and the bottom surface covering portion 22. Thus, the bottom surface 11B of the exterior container 11 is covered with the bottom surface covering portion 22, while the main surfaces 11C of the exterior container 11 are covered with the main surface covering portions 21.

(2) The second side surface covering portion 23B is folded inward at the boundary line L2 between the second side surface covering portion 23B and the bottom surface covering portion 22. Thus, the side surface 11D of the exterior container 11 is covered with the second side surface covering portion 23B.

(3) As shown in FIG. 23, the first side surface covering portion 23A is folded inward at the fold line S1, which is the boundary line between the main-surface-side covering portion 23x and the side-surface-side covering portion 23y, so that the main-surface-side and side-surface-side covering portions 23x and 23y are superposed on one another.

(4) As shown in FIG. 24, the main-surface-side covering portion 23x is folded inward at the boundary line L3 between the main-surface-side covering portion 23x and the main surface covering portion 21, while the side-surface-side covering portion 23y is folded outward at the boundary line L4 between the side-surface-side covering portion 23y and the second side surface covering portion 23B so that the main-surface-side and side-surface-side covering portions 23x and 23y that are superposed on one another are folded on the exterior-side surface of the second side surface covering portion 23B.

(5) After the second side surface covering portion 23B, the main-surface-side covering portion 23x, and the side-surface-side covering portion 23y are folded on the side surfaces 11D of the exterior container 11 so that the second side surface covering portion 23B, the main-surface-side covering portion 23x, and the side-surface-side covering portion 23y are superposed on one another, the superposed parts 25 are welded and made watertight. Thus, the first and second side surface covering portions 23A and 23B cover the side surfaces 11D of the exterior container 11.

For example, a welding plate of a heater (not shown) is pressed onto the superposed part 25 of the first and second side surface covering portions 23A and 23B so that the superposed part 25 can be welded.

According to the aforementioned electrically insulating film 2, the first side surface covering portion 23A includes the side-surface-side covering portion 23y that protrudes from the boundary edge of the second side surface covering portion 23B. Since this side-surface-side covering portion 23y is superposed on the main-surface-side covering portion 23x of the first side surface covering portion 23A, the boundary part between the main surface covering portion 21 and the second side surface covering portion 23B can be more reliably watertightly covered. In this the electrically insulating film, although not illustrated, the side-surface-side covering portion that protrudes from the boundary edge of the second side surface covering portion may be eliminated from the first side surface covering portion. In this case, the second side surface covering portion can cover substantially the whole surface of the side surface of the exterior container, and the first side surface covering portion that protrudes from the main surface covering portion can be superposed on the second side surface covering portion. Thus, the boundary part between the main surface covering portion and the second side surface covering portion can be watertightly covered.

In the processes for covering the exterior container 11 with the electrically insulating film 2, FIGS. 7 12 and 14 to 16, 18 to 20, and 22 to 24 show the processes that, after the exterior container 11 is placed on the interior-side surface of the electrically insulating film 2, the electrically insulating film 2 is folded at the predetermined lines so that the bottom surface 11B, the main surfaces 11C and the side surfaces 11D of the exterior container 11 are covered with the folded electrically insulating film. In the illustrated rectangular battery cells 1, the welding plate of the heater (not shown) is pressed onto the side surface 11D of the exterior container 11 so that the superposed part 25 of the first and second side surface covering portions 23A and 23B can be welded by heat. However, the formation process of the electrically insulating film in the rectangular battery cell according to the present invention is not limited to this. Before the exterior container is placed on the interior-side surface of the electrically insulating film, the electrically insulating film may folded at the predetermined lines and in the predetermined directions, and the superposed parts may be welded so that the electrically insulating film is formed into a bag shape as a whole. After that, the rectangular battery cell can be inserted into the bag-shaped electrically insulating film so that the bottom surface, the main surfaces, and the side surfaces of the exterior container of the rectangular battery cell can be covered with the electrically insulating film. After the electrically insulating film is folded at predetermined line and in the predetermined directions, the superposed parts to be arranged on the both side surfaces of the exterior container are sandwiched and welded by heat by using welding plates of a heater (not shown). This method can greatly reduce the influence of heat on the exterior container in the process for welding the electrically insulating film by the heat. As discussed above, after the exterior container 11 of the rectangular battery cell 1 is covered with the electrically insulating film 2, the electrically insulating film 2 is contracted by heat, and can be brought into tight contact with the exterior-side surface of the exterior container 11.

Also, according to the electrically insulating film 2 shown in FIG. 21, in the aforementioned process (3) shown in FIG. 23, the superposed parts 25A of the main-surface-side and side-surface-side covering portions 23x and 23y that are superposed on one another on the side edge parts of the exterior container 11 are sandwiched from the both sides and are welded by heat using by the welding plates of the heater (not shown). According to this construction, it is possible to greatly reduce the influence of heat on the exterior container 11, and additionally to more reliably weld the superposed part 25A of the main-surface-side and side-surface-side covering portions 23x and 23y by heat and make the superposed part 25A watertight. The welded superposed part 25A is folded on the exterior-side surface of the second side surface covering portion 23B, and is superposed on the side surface 11D of the exterior container 11. After being folded on the side surface 11D of the exterior container 11, the superposed part 25A is welded or adhered to the exterior-side surface of the second side surface covering portion 23B.

Figure 25:
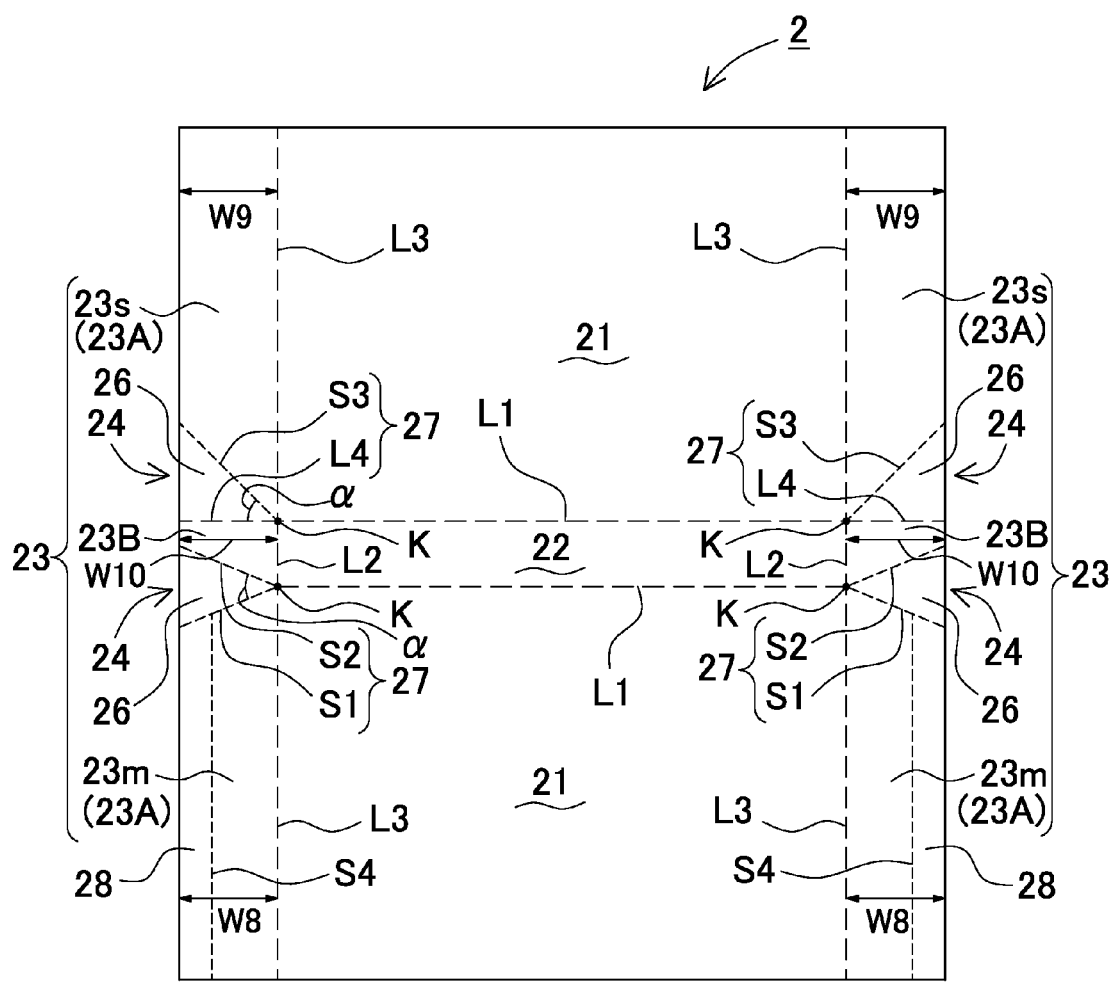
FIG. 25 is a developed view showing still another exemplary electrically insulating film.

Also, in the electrically insulating film 2 shown in a developed view of FIG. 25, substantially the whole surface of the side surface of the exterior container is covered with one of the first side surface covering portions 23A that are arranged on the both sides of the second side surface covering portion 23B. In addition, the end part of the one of the first side surface covering portions 23A is welded to another first side surface covering portion 23A so that the exterior-side surface of the exterior container is covered. In the electrically insulating film 2 shown in FIG. 25, the first side surface covering portions 23A that are arranged on the both boundary sides of the second side surface covering portion 23B include a main side surface covering portion 23m, and a sub side surface covering portion 23s. The main side surface covering portion 23m covers substantially the whole surface of the side surface 11D of the exterior container 11. The end part of the main side surface covering portion 23m can be welded to the sub side surface covering portion 23s. In the illustrated electrically insulating film 2, the protruding width (W8) of the main side surface covering portion 23m, the protruding width (W9) of the sub side surface covering portion 23s, and the protruding width (W10) of the second side surface covering portion 23B are dimensioned larger than the width (D) of the side surface 11D of the exterior container 11. The side edge of the main side surface covering portion 23m, the side edge of the second side surface covering portion 23B, and the side edge of the sub side surface covering portions 23s form a single straight line. Since the entire exterior shape of the electrically insulating film is a rectangle, this electrically insulating film can be easily produced.

The reason for dimensioning the protruding width (W8) of the main side surface covering portion 23m larger than the width (D) of the side surface 11D of the exterior container 11 is to superpose the end part of the main side surface covering portion 23m on the sub side surface covering portion 23s with the side surface 11D of the exterior container 11 being covered with the main side surface covering portion 23m. In the illustrated main side surface covering portion 23m, a fold line S4 extends at the protruding width (interval) same as the width (D) of the side surface 11D in parallel to the boundary line L3 between the main side surface covering portion 23m and the main surface covering portion 21. The side end part of the main side surface covering portion 23m that is located on the side-end side relative to the fold line S4 can serve as a superposing connection area 28 that can be superposed on the sub side surface covering portion 23s. In this electrically insulating film, since the protruding width (W9) of the sub side surface covering portion 23s is only required to a width on which the superposing connection area 28 of the sub side surface covering portion 23s is superposed, the protruding width (W9) of the sub side surface covering portion 23s can be dimensioned smaller than the width (D) of the side surface 11D of the exterior container 11.

In the illustrated electrically insulating film 2, a triangular folded part 26 will be formed in the connection area 24 between the main side surface covering portion 23m and the second side surface covering portion 23B. The triangular folded part 26 can be defined by the fold lines S1 and S2, which are the folding lines 27. In the illustrated electrically insulating film 2, the fold line S1 extends in the main side surface covering portion 23m from the intersection K between the boundary lines L1 and L3, while the fold line S2 extends in the second side surface covering portion 23B from the intersection K so that the triangular folded part 26 is defined. In this electrically insulating film 2, the fold line S1 and the fold line S2 form an angle α of about 45 degrees. The folded part 26 is also folded inward at one of the fold lines S1 and S2, while the folded part 26 is folded outward at another fold line so that the folded part 26 will be superposed on the interior-side or exterior-side surface of the main side surface covering portion 23m. In other words, the folded part 26 is folded so that the folded part 26 is sandwiched between the interior-side surface of the main side surface covering portion 23m and the exterior-side surface of the second side surface covering portion 23B, alternatively, the folded part 26 is folded so that the folded part 26 is sandwiched between the exterior-side surface of the main side surface covering portion 23m and the interior-side surface of the second side surface covering portion 23B. In this electrically insulating film 2, the folding lines 27 for defining the folded part 26 do not include the boundary line L4 between the main side surface covering portion 23m and the second side surface covering portion 23B. Accordingly, when the main side surface covering portion 23m and the second side surface covering portion 23B are superposed on one another, the folding lines 27 of the triangular folded part 26, which is sandwiched between the main side surface covering portion 23m and the second side surface covering portion 23B, can be disconnected from the boundary lines L2 and L3. As a result, it is possible to reduce overlap parts of the main side surface covering portion 23m and the second side surface covering portion 23B, which are superposed on one another on the side surface 11D of the exterior container 11, in proximity to the boundary lines L3 and L2 between the main side surface covering portion 23m and the second side surface covering portion 23B, and the main surface covering portions 21 and the bottom surface covering portion 22. Therefore, the superposed part 25 can be reliably welded. However, the electrically insulating film may have a folded part that is defined by the boundary line L4 between the main side surface covering portion and the second side surface covering portion as the folding line, and arranged in the connection area between the main side surface covering portion and the second side surface covering portion.

In the illustrated electrically insulating film 2, a right-triangular folded part 26 will be formed in the connection area 24 between the sub side surface covering portion 23s and the second side surface covering portion 23B. The triangular folded part 26 can be defined by the boundary line L4 between the sub side surface covering portion 23s and the second side surface covering portion 23B, and the fold line S3 in the sub side surface covering portion 23s. The boundary line L4, and the fold line S3 can serve as the folding lines 27. The folded part 26 can be folded inward at the fold line S3, and folded outward at the boundary line L4. Thus, the folded part 26 can be superposed on the interior-side surface of the sub side surface covering portion 23s.

The electrically insulating film 2 shown in FIG. 25 can formed into a bag shape in the following processes as shown in FIGS. 26 to 29.

Figure 26:
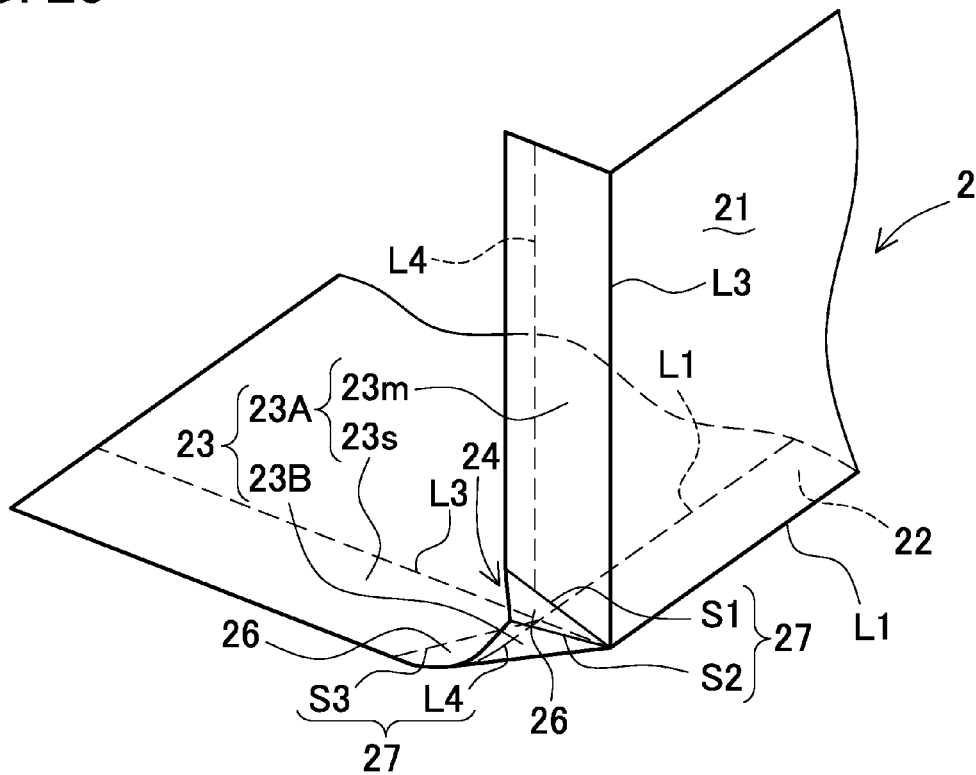
FIG. 26 is a perspective view showing the process for forming the electrically insulating film shown in FIG. 25 into a bag shape.

(1) As shown in FIG. 26, the main surface covering portion 21 that is provided with the main side surface covering portion 23m is folded inward at the boundary line L1 between the main surface covering portion 21 and the bottom surface covering portion 22. Subsequently, the main side surface covering portion 23m is folded inward at the boundary line L3 between the main side surface covering portion 23m and the main surface covering portion 21.

Figure 27:
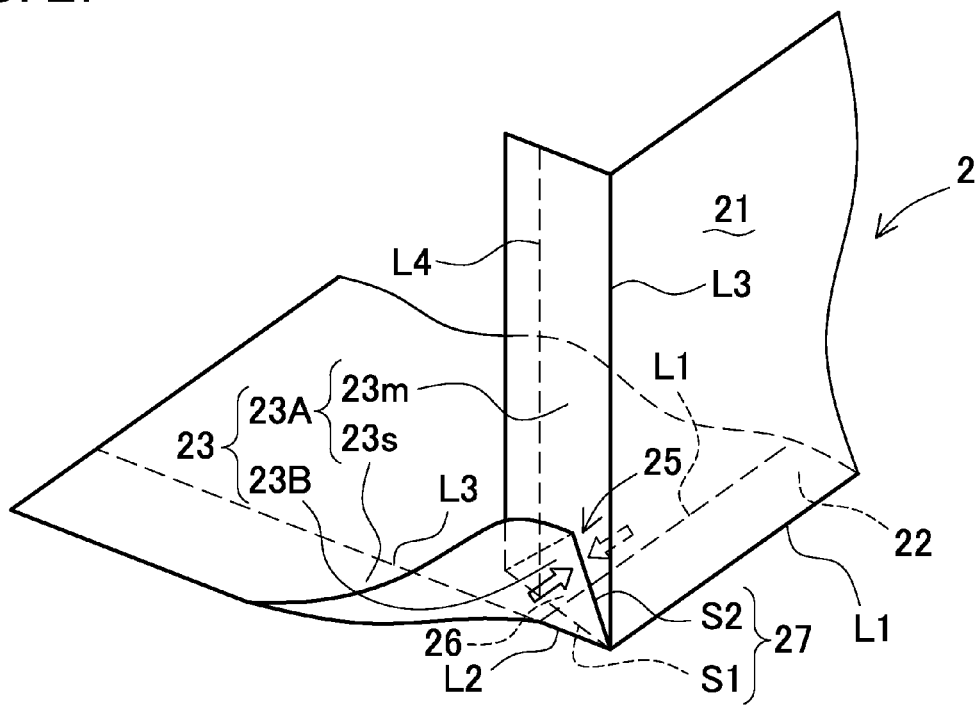
FIG. 27 is a perspective view showing the process for forming the electrically insulating film shown in FIG. 25 into a bag shape.

(2) As shown in FIG. 27, in the connection area 24 between the main side surface covering portion 23m and the second side surface covering portion 23B, the folded part 26 is folded outward at the fold line S1, which is one edge of the folded part 26, and is folded inward at the fold line S2, which is other one edge of the folded part 26, so that the folded part 26 is sandwiched between the exterior-side surface of the main side surface covering portion 23m and the interior-side surfaces of the second side surface covering portion 23B.

(3) After the main side surface covering portion 23m and the second side surface covering portion 23B are superposed on one another so that the folded part 26 is interposed between the main side surface covering portion 23m and the second side surface covering portion 23B, the superposed part 25 is sandwiched from the both sides by the welding plates of the heater (not shown) as shown by arrows in FIG. 27, and welded by heat.

(4) As shown in FIG. 26, the main surface covering portion 21 that is provided with the sub side surface covering portion 23s is folded inward at the boundary line L1 between the main surface covering portion 21 and the bottom surface covering portion 22. In the connection area 24 between the sub side surface covering portion 23s and the second side surface covering portion 23B, the folded part 26 is folded inward at the fold line S3, which is one edge of the folded part 26, and is folded outward at the boundary line L4, which is other one edge of the folded part 4. After that, the main side surface covering portion 23m is folded outward at the fold line S4 so that the superposing connection area 28 of the main side surface covering portion 23m is superposed on the sub side surface covering portion 23s. In this process, the main side surface covering portion 23m is folded so that the fold line S4 in the main side surface covering portion 23m agrees with the boundary line L3 between the sub side surface covering portion 23s and the main surface covering portion 21.

Figure 28:
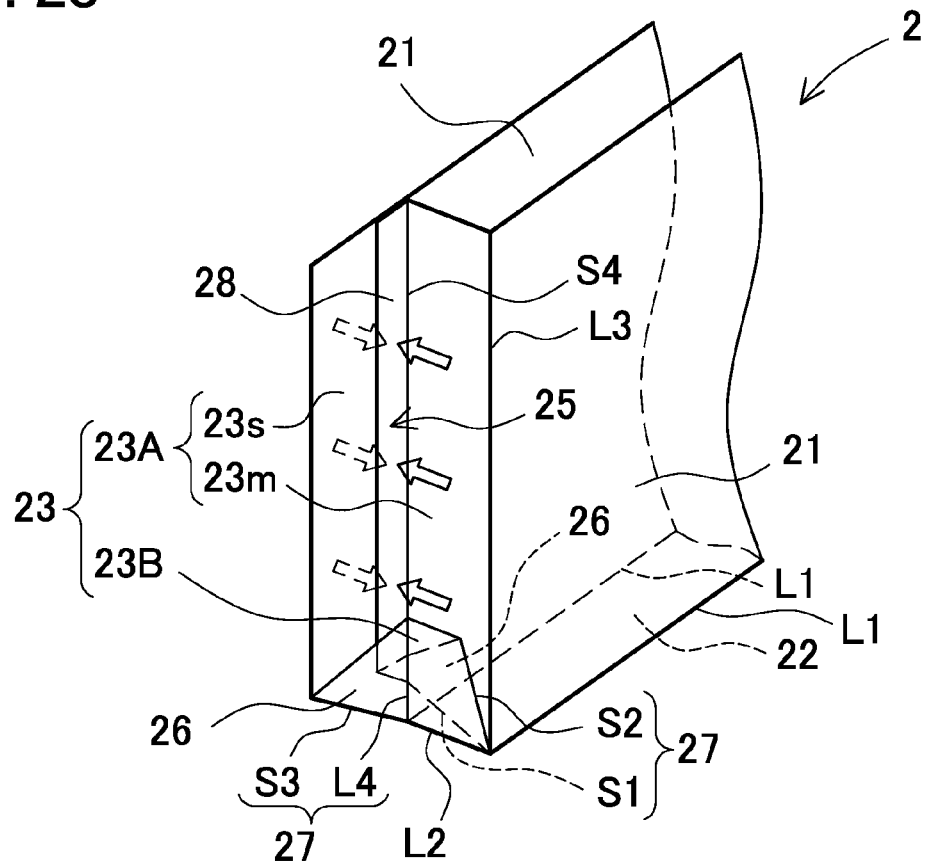
FIG. 28 is a perspective view showing the process for forming the electrically insulating film shown in FIG. 25 into a bag shape.

(5) The superposed part 25 of the superposing connection area 28 of the main side surface covering portion 23m and the sub side surface covering portion 23s is sandwiched from the both sides by the welding plates of the heater (not shown) as shown by arrows in FIG. 28, and welded by heat.

Figure 29:
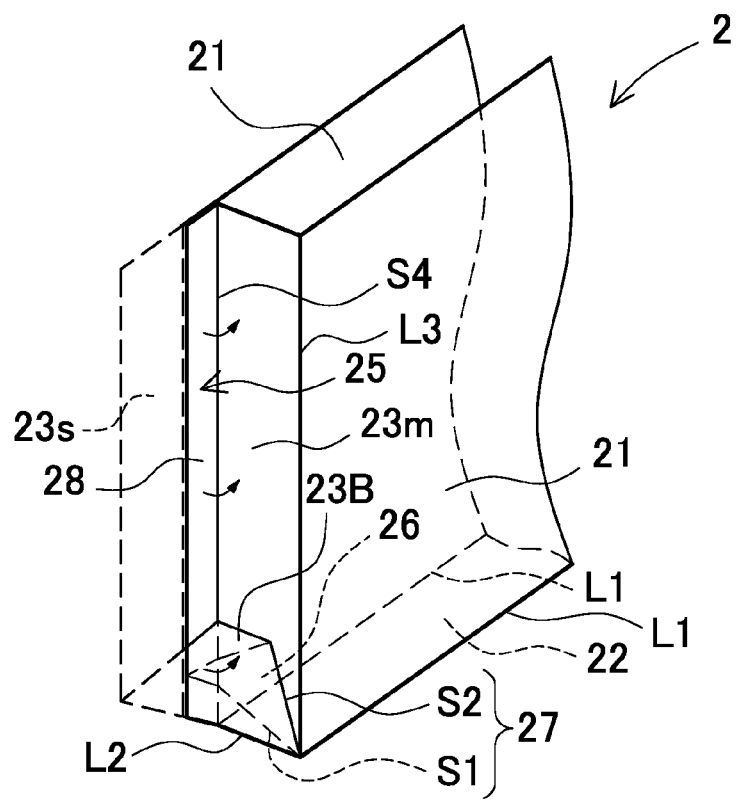
FIG. 29 is a perspective view showing the process for forming the electrically insulating film shown in FIG. 25 into a bag shape.

(6) As shown by dashed lines in FIG. 29, the end part of the sub side surface covering portion 23s is cut out along the side edge of the superposed part 25, which has been welded by the heat, so that the cut-out part is removed.

(7) After the end part of the sub side surface covering portion 23s is cut out and removed, the superposed part 25 of the main side surface covering portion 23m and the cut-out sub side surface covering portion 23s is folded and is superposed on the exterior-side surface of the main side surface covering portion 23m as shown by arrows lines in FIG. 29. The folded superposed part 25 is welded or adhered to the exterior-side surface of the main side surface covering portion 23m.

Figure 30:
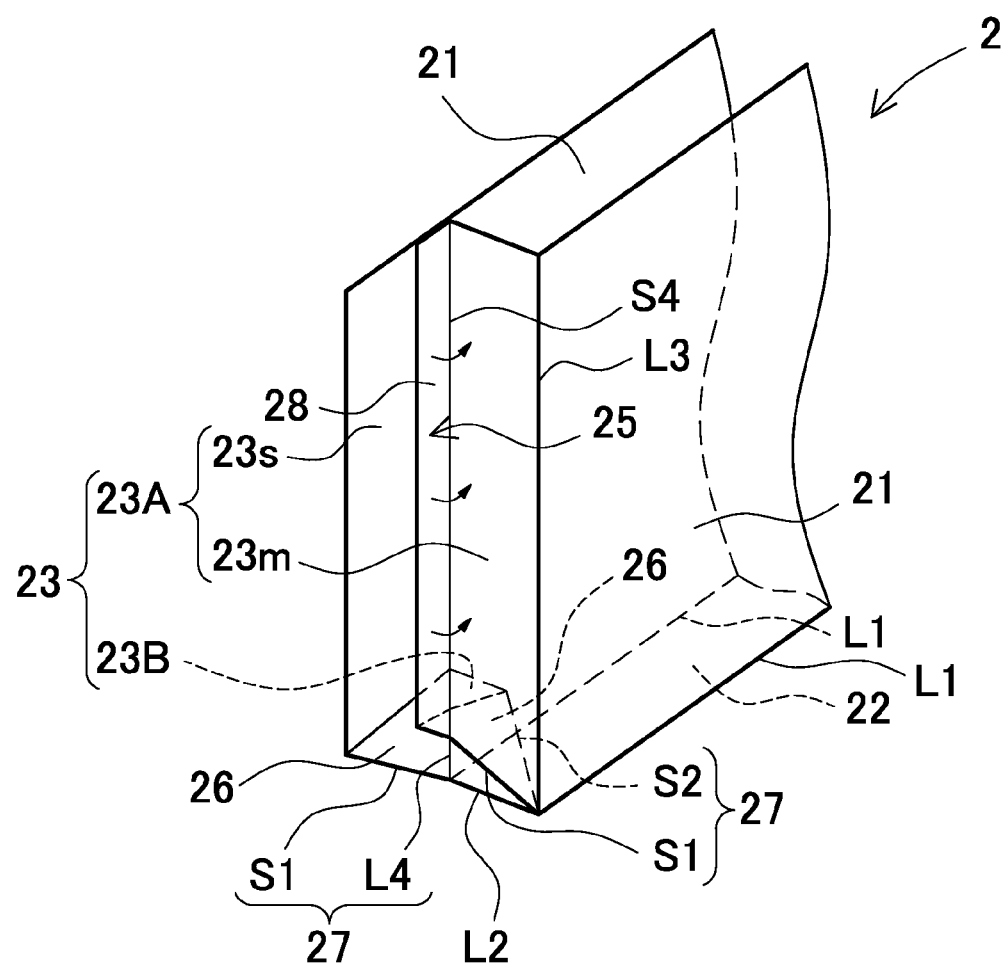
FIG. 30 is a perspective view showing another process for forming the electrically insulating film shown in FIG. 25 into a bag shape.

On the other hand, in the electrically insulating film 2 shown in FIG. 25, in the aforementioned process (2), as shown in FIG. 30, the folded part 26 may be folded inward at the fold line S1, which is one edge of the folded part 26, and be folded outward at the fold line S2, which is other one edge of the folded part 26, so that the folded part 26 can be sandwiched between the interior-side surface of the main side surface covering portion 23m and the exterior-side surface of the second side surface covering portion 23B. Also, in this case, the electrically insulating film 2 can be formed into a bag shape similarly to the aforementioned processes (3) to (7).

The exterior container of the rectangular battery cell is inserted into the electrically insulating film 2 that is formed into a bag shape as discussed above. Thus, the bottom surface, the main surfaces, and the side surfaces of the exterior container can be covered with the electrically insulating film. In addition, after the exterior container is inserted into the electrically insulating film, the electrically insulating film is contracted by heat, and can be brought into tight contact with the surfaces of the exterior container.

The aforementioned power supply devices can be used as a power supply for vehicles. The power supply device can be installed on electric vehicles such as hybrid cars that are driven by both an internal-combustion engine and an electric motor, and electric cars that are driven only by an electric motor. The power supply device can be used as a power supply device for these types of vehicles.

(Hybrid Car Power Supply Device)

Figure 31:
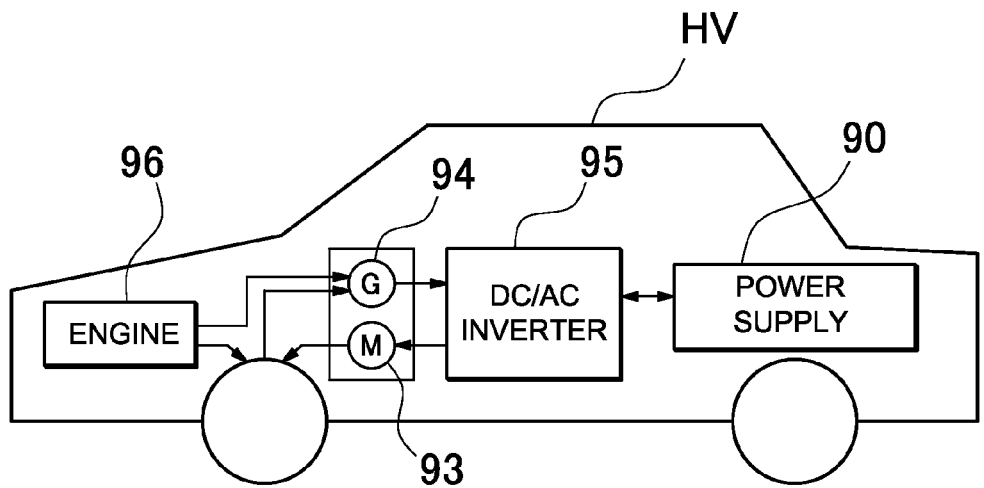
FIG. 31 is a block diagram showing an exemplary hybrid car which is driven by an internal-combustion engine and an electric motor, and includes a power supply device.

FIG. 31 is a block diagram showing an exemplary hybrid car that is driven both by an internal-combustion engine and an electric motor, and includes the power supply device. The illustrated vehicle HV to be equipped with a power supply device 90 includes an electric motor 93 and an internal-combustion engine 96 that drive the vehicle HV, the power supply device 90 that supplies electric power to the electric motor 93, and an electric generator 94 that charges batteries of the power supply device 90. The power supply device 90 is connected to the electric motor 93 and the electric generator 94 via a DC/AC inverter 95. The vehicle HV is driven both by the electric motor 93 and the internal-combustion engine 96 with the batteries of the power supply device 90 being charged/discharged. The electric motor 93 is energized and drives the vehicle in a poor engine efficiency range, e.g., in acceleration or in a low speed range. The electric motor 93 is energized by electric power that is supplied from the power supply device 90. The electric generator 94 is driven by the engine 96 or by regenerative braking when users brake the vehicle so that the batteries of the power supply device 90 are charged.

(Electric Vehicle Power Supply Device)

Figure 32:
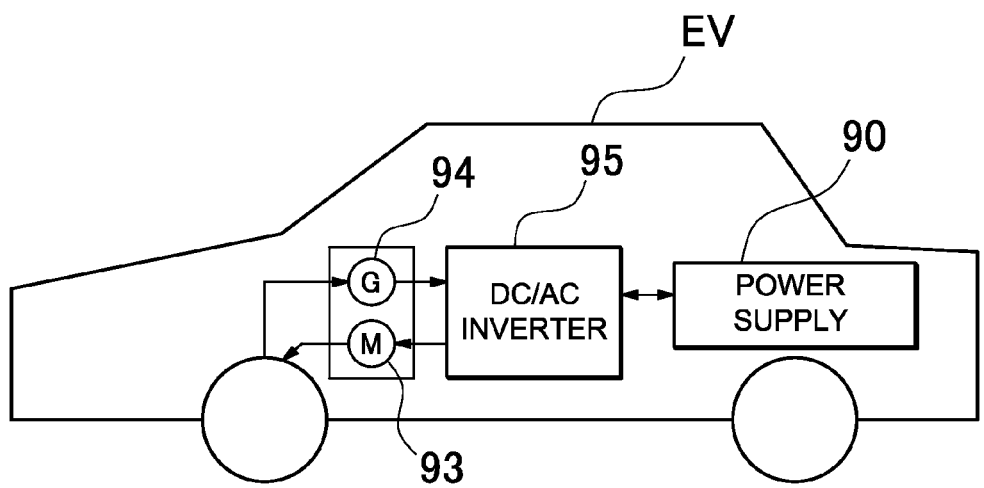
FIG. 32 is a block diagram showing an exemplary electric vehicle that is driven only by an electric motor, and includes the power supply device.

FIG. 32 shows an exemplary electric vehicle that is driven only by an electric motor, and includes the power supply device. The illustrated vehicle EV equipped with the power supply device 90 includes the electric motor 93, which drives the vehicle EV, the power supply device 90, which supplies electric power to the electric motor 93, and the electric generator 94, which charges batteries of the power supply device 90. The power supply device 90 is connected to the electric motor 93 and the electric generator 94 via a DC/AC inverter 95. The electric motor 93 is energized by electric power that is supplied from the power supply device 90. The electric generator 94 can be driven by vehicle EV regenerative braking so that the batteries of the power supply device 90 are charged.

(Power Storage Type Power Supply Device)

A power supply device according to the present invention is not limited to be used as the power supply for the electric motor for vehicle travelling. A power supply device according to the present invention can be used as a power storage type power supply device including batteries that can be charged with electric power generated by solar battery, aerogenerator and the like, and store the electric power. Alternatively, a power supply device according to the present invention can be used as a power storage type power supply device including batteries that can be charged with midnight electric power, and store the electric power. A power supply device to be charged with midnight electric power can be charged with midnight electric power as surplus electric power of power plants, and can supply the electric power in daytime where power demand is high so that the peak power demand for power plants can be reduced. In addition, the power supply device can be constructed to be charged both with electric power generated by solar batteries, and the midnight electric power. This power supply device can efficiently store electric power by effectively using electric power generated by solar batteries, and the midnight electric power in consideration of weather and required power consumption.

Figure 33:
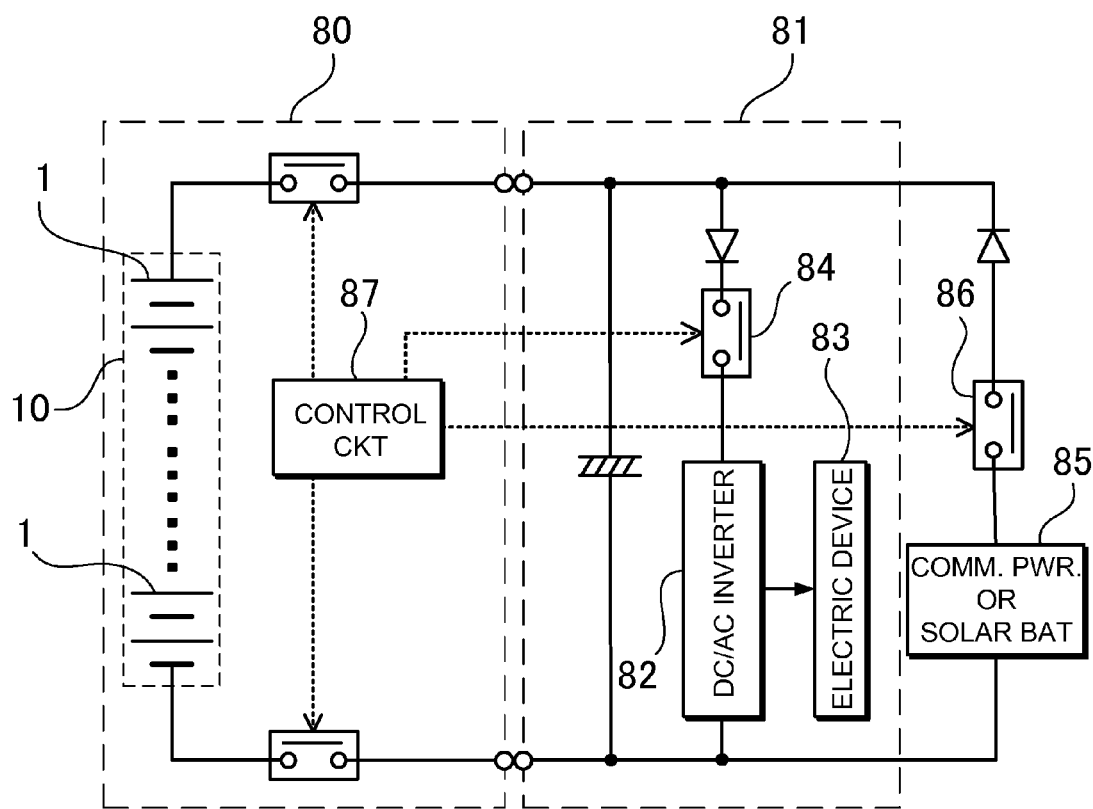
FIG. 33 is a block diagram a power storage type power supply device to which the present invention is applied.
Figure 34:
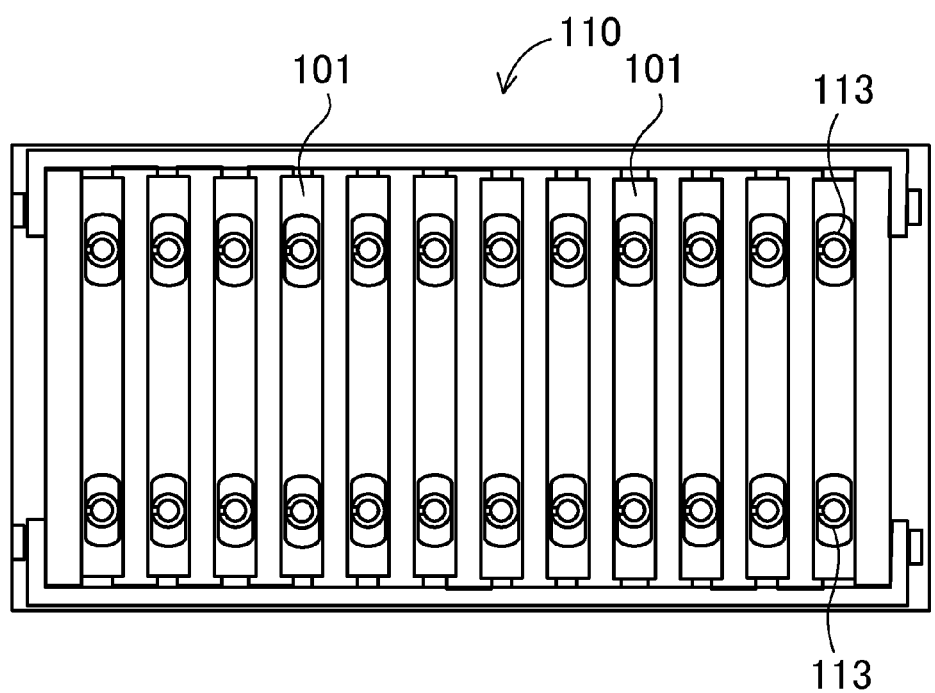
FIG. 34 is a plan view showing a known power supply device including rectangular battery cell that are arranged side by side.
Figure 35:
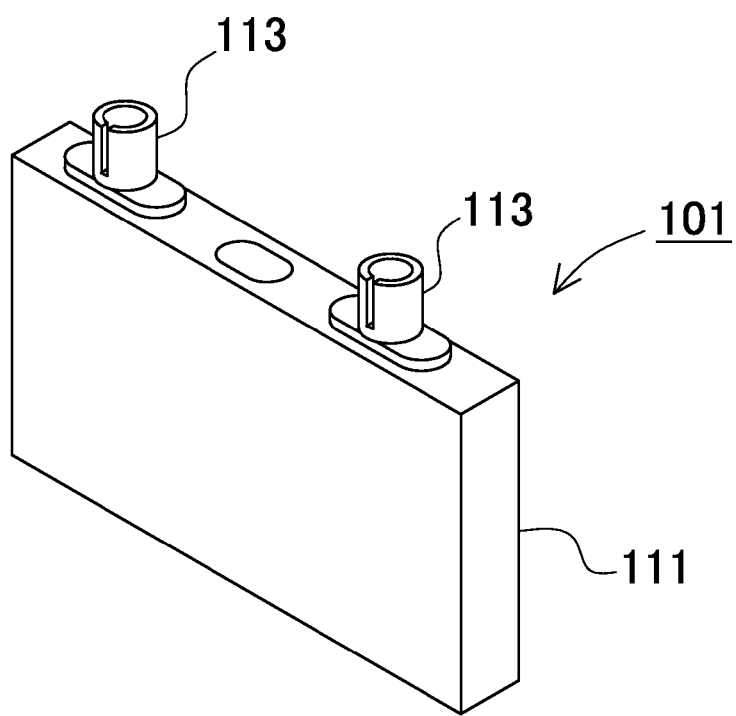
FIG. 35 is a perspective view showing the rectangular battery cell shown in FIG. 34.

In an electric power storage device shown in FIG. 33, batteries of a power supply device 80 can be charged by a charging power supply 85 such as midnight electric power of commercial power, solar batteries, and the like. The batteries of the power supply device 80 can be discharged and supply electric power to a DC/AC inverter 82 of a load 81. To achieve this, the illustrated electric power storage device has charging and discharging modes. The charging power supply 85 is connected to the power supply device 80 through a charging switch 86. The DC/AC inverter 82 is connected to the power supply device 80 through a discharging switch 84. The discharging switch 84 and the charging operation switch 86 are turned ON/OFF by a control circuit 87 of the power supply device 80. In the charging mode, the control circuit 87 turns the charging operation switch 86 ON, and turns the discharging switch 84 OFF so that the batteries of the power supply device 80 can be charged with electric power supplied from the charging power supply 85. According to the power supply device 80, if charging operation is completed so that the batteries are fully charged, or if the capacity of the batteries reaches a predetermined value, the control circuit 87 turns the charging switch 86 OFF so that charging operation stops. In the discharging mode, the control circuit 87 turns the discharging operation switch 84ON, and turns the charging switch 86 OFF so that electric power can be supplied to the load 81 from the power supply device 80. In the load 81 to be supplied with electric power from the power supply device 80, the electric power will be supplied to an electric device 83 through the DC/AC inverter 82 from the power supply device 80. According to the power supply device 80, if the remaining capacity of the batteries decreases to a predetermined value, the control circuit 87 turns the discharging switch 84 OFF so that discharging operation stops. In addition, if necessary, the charging operation switch 86 may be turned ON, while the discharging switch 84 may be turned ON in the electric power storage device so that the load 81 can be supplied with electric power while the power supply device 80 can be charged.

INDUSTRIAL APPLICABILITY

A power supply device according to the present invention can be suitably applied to power supple devices of plug-in hybrid vehicles and hybrid electric vehicles that can switch between the EV drive mode and the HEV drive mode, electric vehicles, and the like. Also, a power supply device according to the present invention can be suitably used as backup power supply devices that can be installed on a rack of a computer server, backup power supply devices for wireless communication base stations, electric power storages for home use or plant use, electric power storage devices such as electric power storages for street lights connected to solar cells, backup power supplies for signal lights, and the like.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2011-169,675 filed in Japan on Aug. 2, 2011, the content of which is incorporated herein by reference.

What is claimed is:

1. A power supply device comprising:
a plurality of rectangular battery cells; and
a holding portion that holds said plurality of rectangular battery cells with the rectangular battery cells being arranged side by side,
wherein, each of the rectangular battery cells includes
a rectangular exterior container that has a top surface, a bottom surface, a pair of main surfaces and side surfaces, and
an electrically insulating film that covers the main surfaces, the side surfaces and the bottom surface of the exterior container,
wherein the electrically insulating film is formed from a sheet of electrically insulating film that has main, bottom and side surface covering portions, wherein the main, bottom and side surface covering portions are continuously arranged, and cover the main, bottom and side surfaces of the exterior container, respectively,
wherein said electrically insulating film is shaped so that the bottom surface covering portion is arranged between the pair of main surface covering portions, and the side surface covering portions protrude from the both sides of the main surface covering portions and the bottom surface covering portion, which are continuously arranged,
wherein each of the side surface covering portions has first side surface covering portions that protrude from the side edges of the main surface covering portions, and a second side surface covering portion that protrudes outward of the bottom surface covering portion,
wherein the first and second side surface covering portions are not separated from the both side edges of the main and bottom surface covering portion so that the first and second side surface covering portions are continuously arranged in connection areas between the first and second side surface covering portions,
wherein the bottom and main surface covering portions are folded inward at the boundary lines between the bottom and main surface covering portions so that the bottom and main surface covering portions cover the bottom and main surfaces of the exterior container, respectively,
wherein the second and bottom surface covering portions are folded inward at the boundary lines between the second and bottom surface covering portions, wherein the first and main surface covering portions are folded inward at the boundary lines between the first and main surface covering portions, wherein the first and second side surface covering portions are folded in parts in proximity to the connection area between the first and second side surface covering portions so that the first and second side surface covering portions are superposed on one another on the side surfaces of the exterior container, wherein the superposed parts are welded and made watertight, wherein the first and second side surface covering portions cover the side surfaces of the exterior container, and
wherein the plurality of rectangular battery cells are arranged side by side and held by the holding portion so that the bottom surfaces of the plurality of rectangular battery cells are aligned coplanar with each other.

2. The power supply device according to claim 1, wherein said first and second side surface covering portions are folded at folding lines that are arranged in the parts in proximity to the connection area between first and second side surface covering portions, wherein the folding lines extend upward from the bottom surface of the exterior container.

3. The power supply device according to claim 1, wherein said first side surface covering portion includes a wide side surface covering portion that has a larger protruding width protruding from said main surface covering portion, and a narrow side surface covering portions that has a smaller protruding width protruding from said main surface covering portion, wherein said wide side surface covering portion is partially superposed on said narrow side surface covering portion and said second side surface covering portion, wherein the superposed part is welded and made watertight, and
wherein the side surface of the exterior container is covered with said wide side surface covering portion, said narrow side surface covering portion, and said second side surface covering portion.

4. The power supply device according to claim 3, wherein the protruding width of said narrow side surface covering portion is equal to the protruding width of said second side surface covering portion, and the protruding width of said wide side surface covering portion is substantially equal to the width of the side surface of said exterior container, and wherein said narrow side surface covering portion and said second side surface covering portion are continuously arranged at the boundary line that has the same length as the protruding width of said narrow and second side surface covering portions.

5. The power supply device according to claim 4, wherein said narrow and second side surface covering portions are folded in the boundary part between said narrow and second side surface covering portions so that said narrow and second side surface covering portions are superposed on one another on the surface of said exterior container, wherein said wide and second side surface covering portions are folded in the boundary part between said wide and second side surface covering portions so that said wide and second side surface covering portions are superposed on one another on the surface of said exterior container, wherein the superposed parts are welded and made watertight.

6. The power supply device according to claim 1, wherein the protruding width of said second side surface covering portion is equal to the length of said first side surface covering portion, and wherein said first and second side surface covering portions are superposed on one another on the side surface of said exterior container, wherein the superposed part is made watertight.

7. The power supply device according to claim 6, wherein said first side surface covering portion includes a main-surface-side covering portion that protrudes from the side edge of said main surface covering portion, and a side-surface-side covering portion that protrudes from the boundary edge of said second side surface covering portion in the connection area between said first and second side surface covering portions, wherein the protruding widths of said main-surface-side and side-surface-side covering portions are narrower than the width of the side surface of the exterior container, and wherein said main-surface-side and side-surface-side covering portions are folded in the boundary part between said main-surface-side and side-surface-side covering portions, and superposed on one another.

8. The power supply device according to claim 7, wherein the protruding width of said main-surface-side covering portion is equal to the protruding width of said side-surface-side covering portion.

9. The power supply device according to claim 1, wherein said electrically insulating film is formed from a heat contraction film.

10. The power supply device according to claim 1, further comprising a cooling plate that is thermally connected and fastened to the bottom surfaces of the rectangular battery cell so that the rectangular battery cells can be forcedly cooled by the cooling plate.

11. The power supply device according to claim 1, wherein said power supply device is a vehicle power supply device.

12. The power supply device according to claim 1, wherein said power supply device is a power storage type power supply device.

13. A vehicle comprising the power supply device according to claim 1.

* * * * *